United States Patent
Hayashi

(10) Patent No.: US 7,907,176 B2
(45) Date of Patent: Mar. 15, 2011

(54) IMAGE PICKUP SYSTEM, METHOD FOR CONTROLLING SHOOTING DIRECTION OF IMAGE PICKUP DEVICE, AND PROGRAM THEREFOR

(75) Inventor: Tadashi Hayashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 547 days.

(21) Appl. No.: 11/739,008

(22) Filed: Apr. 23, 2007

(65) Prior Publication Data
US 2007/0257990 A1   Nov. 8, 2007

(30) Foreign Application Priority Data
Apr. 24, 2006 (JP) ................................. 2006-119258

(51) Int. Cl.
*H04N 5/228* (2006.01)
(52) U.S. Cl. .................................................. 348/208.7
(58) Field of Classification Search ............. 348/208.99, 348/208.1, 208.2, 208.3, 208.4, 208.5, 208.6, 348/208.7, 208.11, 208.12, 208.14
See application file for complete search history.

(56) References Cited

U.S. PATENT DOCUMENTS

| | | | |
|---|---|---|---|
| 4,774,589 A * | 9/1988 | Rowland | 348/208.7 |
| 5,761,545 A * | 6/1998 | Tanaka et al. | 396/53 |
| 5,764,786 A * | 6/1998 | Kuwashima et al. | 382/107 |
| 5,771,069 A * | 6/1998 | Kobayashi | 348/208.11 |
| 7,195,355 B2 * | 3/2007 | Nashner | 351/246 |
| 7,557,831 B2 * | 7/2009 | Yamazaki | 348/208.6 |
| 2005/0062852 A1 * | 3/2005 | Yamazaki | 348/208.6 |
| 2005/0168582 A1 * | 8/2005 | Stuckler | 348/208.2 |
| 2005/0243277 A1 * | 11/2005 | Nashner | 351/246 |
| 2005/0254805 A1 * | 11/2005 | Moriya et al. | 396/53 |

FOREIGN PATENT DOCUMENTS

JP   2000-221953 A   8/2000

* cited by examiner

*Primary Examiner* — Nicholas G Giles
(74) *Attorney, Agent, or Firm* — Rossi, Kimms & McDowell LLP

(57) ABSTRACT

An image pickup system capable of obtaining images to be observed without giving a sense of discomfort to an observer, while moving as fast as possible. The image pickup system comprises an image pickup device, and a drive section arranged to rotate the image pickup device in a first direction and a second direction orthogonal to the first direction, respectively. A directive is issued on a rotation target angle of the image pickup device associated with the first direction and a rotation target angle of the image pickup device associated with the second direction. A component higher than a specified cut-off frequency in a command signal associated with the first direction entered from the command section is cut. A component higher than a specified cut-off frequency in a command signal associated with the second direction entered from the command section is cut. A rotation drive command associated with the first direction and a rotation drive command associated with the second direction are outputted to the drive section, respectively, based on each output of the first signal processing section and the second signal processing section. The specified cut-off frequency of the first signal processing section is lower than that of the second signal processing section.

7 Claims, 18 Drawing Sheets

—— MOVEMENT OF CAMERA IN PAN AXIS DIRECTION
------ SIGNAL GENERATED BY ANGLE INPUT SECTION

—— MOVEMENT OF CAMERA IN TILT AXIS DIRECTION
------ SIGNAL GENERATED BY ANGLE INPUT SECTION

——— RESPONSE WHEN DEAD BAND IS PROVIDED
------- POSITION COMMAND FOR SERVO CONTROLLER

IMAGE PICKUP SYSTEM, METHOD FOR CONTROLLING SHOOTING DIRECTION OF IMAGE PICKUP DEVICE, AND PROGRAM THEREFOR

BACKGROUND OF THE INVENTION

1. Field of the Invention

The present invention relates to an image pickup system applied to monitoring, image tracking or the like, a method for controlling the shooting direction of an image pickup device, and a program therefor.

2. Description of the Related Art

Conventionally, for the purpose of remote operation and automatic control of a shooting direction, there has been known a video camera device equipped with a pan pivot mechanism and a tilt pivot mechanism that allow the shooting direction to be changed two-dimensionally. By combining this video camera device with a position controller, the camera can be pointed automatically in a predetermined direction to observe moving images. Several methods may be used for the position controller, such as a servo control method for implementing feedback control based on a difference between a command value to issue a directive on the direction of the camera and its current position, and an open control method for implementing feed control by a predetermined distance by means of a stepping motor or the like.

In addition, automatic tracking can be achieved by detecting a predetermined object such as a person, and controlling the direction of the camera so that the object falls within its screen. As a method for detecting an object, there has been known a method in which the features of an object are extracted from an image to recognize the object, and a method in which the position of the object is detected by using an ultrasonic echo or infrared radiation.

Such a video camera device described above can be used for a tracking video camera device that tracks a child who is moving about, for example, so as not for the child to protrude from the screen, a monitoring system for monitoring a suspicious person, and a system for controlling view angles in a sports relay broadcast on TV. This type of systems usually has a monitor to allow images to be observed in real time. The system also can record images on a recording medium so that the images may be replayed and observed later.

In this type of systems, when images are observed, a situation where switching between the images takes place as the camera moves is always encountered. In order not to give a sense of discomfort to an observer at such a time, there has been proposed a method in which the eye movement of the observer is detected to gradually switch from one image to another image (see e.g. Japanese Laid-Open Patent Publication (Kokai) No. 2000-221953). There has also been proposed the fact that it is effective to add ±2 degrees of a dead band to the movement of a manipulator for the removal of unpleasantness associated with the movement of a tracking camera for fingertip observation when the manipulator is remotely operated (see e.g. "Automatic camera tracking for remote manipulators" proc. Of the 1984. National Topical Meeting on Robotics and Remote Handling in Hostile Environments pp. 383-391, 1984. (hereinafter referred to as "Non-Patent Document").

However, in the conventional video camera device capable of changing the shooting direction, when the shooting direction is changed, moving images present unnatural movement as the camera moves, and therefore unpleasantness is given to the observer. In particular, since the shooting direction is often switched during tracking operation, if high-speed tracking is performed at several Hz or more of response speed, the observer feels considerable unpleasantness. This unpleasantness may cause some people to feel a symptom like seasickness, called image-sickness.

Additionally, human visual acuity for objects that are moving (so-called dynamic visual acuity) is usually poorer than static visual acuity. More specifically, as shown in FIG. 24, cognitive ability tends to rapidly deteriorate for fast movement. The term of cognitive ability herein represents the relative ability of what percentage of oscillating strings can be recognized, for example. As a result, when a screen oscillates at high speed, the observational ability deteriorates, and long observation causes fatigue.

In connection with this, the method described in the above Japanese Laid-Open Patent Publication (Kokai) No. 2000-221953. is disadvantageous because the method needs a large-scale device to detect the eye movement, which imposes a burden on an observer who puts on the device, and involves expenses. In addition, at the time of switching between images, this method uses an intermediate image to gradually change images, however, the intermediate image is a composite image, and therefore there is no guarantee that the image really represents an actual situation. Accordingly, it is highly likely to give a sense of discomfort to the observer. Incidentally, in the embodiment described in the above Japanese Laid-Open Patent Publication (Kokai) No. 2000-221953, an image to be displayed is animation, not a real image.

On the other hand, the method described in the above non-patent document has a certain effect of reducing image-sickness. However, for fast oscillation that the observer cannot follow, if the oscillation is greater than the dead band, the screen oscillates hard, and therefore the unpleasantness of the observer cannot be removed. Additionally, since the addition of the dead band makes the movement discontinuous, step-like movement is caused near boundaries of drive and stop, and the image is not switched smoothly, and therefore, not all of the sense of discomfort can be wiped out. Additionally, since a given dead band is always provided regardless of the movement of an object to be tracked, the image to be observed is not always optimized.

SUMMARY OF THE INVENTION

The present Invention provides an image pickup system capable of obtaining images to be observed without giving a sense of discomfort to an observer, while moving as fast as possible, a method for controlling the shooting direction of an image pickup device, and a program therefor.

In a first aspect of the present invention, there is provided an image pickup system comprising an image pickup device, and a drive section arranged to rotate the image pickup device in a first direction and a second direction orthogonal to the first direction, respectively, comprising: a command section arranged to issue a directive on a rotation target angle of the image pickup device associated with the first direction and a rotation target angle of the image pickup device associated with the second direction; a first signal processing section arranged to cut a component higher than a specified cut-off frequency in a command signal associated with the first direction entered from the command section; a second signal processing section arranged to cut a component higher than a specified cut-off frequency in a command signal associated with the second direction entered from the command section; and a control section arranged to output to the drive section a rotation drive command associated with the first direction and a rotation drive command associated with the second direction, respectively, based on each output of the first signal processing section and the second signal processing section, wherein the specified cut-off frequency of the first signal processing section is lower than that of the second signal processing section.

In a second aspect of the present invention, there is provided an image pickup system comprising an image pickup device and a drive section arranged to rotate the image pickup device in a first direction and a second direction orthogonal to the first direction, respectively, comprising: a prediction section arranged to predict the movement of an object to be shot by the image pickup device; a conversion section arranged to convert a prediction signal of the prediction section into a command signal associated with the first direction and a command signal associated with the second direction; a first signal processing section arranged to cut a component higher than a specified cut-off frequency in a command signal associated with the first direction; a second signal processing section arranged to cut a component higher than a specified cut-off frequency in a command signal associated with the second direction; and a control section arranged to output to the drive section a rotation drive command associated with the first direction and a rotation drive command associated with the second direction, respectively, based on each output of the first signal processing section and the second signal processing section, wherein the specified cut-off frequency of the first signal processing section is lower than that of the second signal processing section.

In a third aspect of the present invention, there is provided an image pickup system comprising an image pickup device and a drive section arranged to rotate the image pickup device in a first direction and a second direction orthogonal to the first direction, respectively, comprising: a prediction section arranged to predict the movement of an object to be shot by the image pickup device; a detection section arranged to detect the attitude of the image pickup device; a signal processing section arranged to cut a component higher than a specified cut-off frequency in components associated with the first direction and components associated with the second direction; respectively, in a prediction signal from the prediction section, based on the attitude of the image pickup device detected by the detection section; a conversion section arranged to convert each output of the signal processing section into a command signal associated with the first direction and a command signal associated with the second direction; and a control section arranged to output to the drive section a rotation drive command associated with the first direction and a rotation drive command associated with the second direction, respectively, based on each output of the conversion section, wherein the specified cut-off frequency for the first directional component of the signal processing section is lower than that for the second specified directional component.

In a fourth aspect of the present invention, there is provided an image pickup system comprising an image pickup device and a drive section arranged to rotate the image pickup device in a first direction and a second direction orthogonal to the first direction, respectively, comprising: a prediction section arranged to predict the movement of an object to be shot by the image pickup device; a decomposition section arranged to decompose a prediction signal of the prediction section into a component associated with the first direction and a component associated with the second direction; a first signal processing section arranged to cut a component higher than a specified cut-off frequency in components associated with the first direction; a second signal processing section arranged to cut a component higher than a specified cut-off frequency in components associated with the second direction; and a detection section arranged to detect the attitude of the image pickup device; a conversion section arranged to convert the output of the first signal processing section and the output of the second signal processing section into a command signal associated with the first direction and a command signal associated with the second direction, respectively, based on the attitude of the image pickup device detected by the detection section; and a control section arranged to output to the each drive section a rotation drive command associated with the first direction and a drive command associated with the second direction, respectively, based on the output of the conversion section, wherein the specified cut-off frequency of the first signal processing section is lower than that of the second signal processing section.

In a fifth aspect of the present invention, there is provided an image pickup system comprising an image pickup device and a drive section arranged to rotate the image pickup device in a first direction and a second direction orthogonal to the first direction, respectively, comprising: a command section arranged to issue a directive on a rotation target angle of the image pickup device associated with the first direction and a rotation target angle of the image pickup device associated with the second direction; a first dead band section arranged to set a dead band width in a command signal associated with the first direction from the command section; a second dead band section arranged to set a dead band width in a command signal associated with the second direction from the command section; and a control section arranged to output to the drive section a rotation drive command associated with the first direction and a rotation drive command associated with the second direction, respectively, based on each output of the first dead band section and the second dead band section, wherein the dead band width in the first dead band element is wider than that in the second dead band element.

In a sixth aspect of the present invention, there is provided an shooting direction control method of an image pickup device that changes the shooting direction of the image pickup device having a drive section arranged to rotate the image pickup device in a first direction and a second direction orthogonal to the first direction, respectively, comprising: a command step for issuing a directive on a rotation target angle of the image pickup device associated with the first direction and a rotation target angle of the image pickup device associated with the second direction; a first signal processing step for cutting a component higher than a specified cut-off frequency in a command signal associated with the first direction entered by the command step; a second signal processing step for cutting a component higher than a specified cut-off frequency in a command signal associated with the second direction entered by the command step; and a control step for outputting to the drive section a rotation drive command associated with the first direction and a rotation drive command associated with the second direction, respectively, based on each output in the first signal processing step and the second signal processing step, wherein the specified cut-off frequency in the first signal processing step is lower than that in the second signal processing step.

In a seventh aspect of the present invention, there is provided an shooting direction control method of an image pickup device that changes the shooting direction of the image pickup device having a drive section arranged to rotate the image pickup device in a first direction and a second direction orthogonal to the first direction, respectively, comprising: a prediction step for predicting the movement of an object to be shot by the image pickup device; a conversion step for converting a prediction signal in the prediction step into a command signal associated with the first direction and a command signal associated with the second direction; a first signal processing step for cutting a component higher than a specified cut-off frequency in a command signal associated with the first direction; a second signal processing step for cutting a component higher than a specified cut-off frequency in a command signal associated with the second direction; and a control step for outputting to the drive section a rotation drive command associated with the first direction and a rotation drive command associated with the second direction, respectively, based on each output in the first signal processing step and the second signal processing step, wherein the specified cut-off frequency in the first signal processing step is lower than that in the second signal processing step.

In an eighth aspect of the present invention, there is provided an shooting direction control method of an image pickup device that changes the shooting direction of the image pickup device having a drive section arranged to rotate the image pickup device in a first direction and a second direction orthogonal to the first direction, respectively, comprising: a prediction step for predicting the movement of an object to be shot by the image pickup device; a detection step for detecting the attitude of the image pickup device; a signal processing step for cutting a component higher than a specified cut-off frequency in components associated with the first direction and components associated with the second direction, respectively, in a prediction signal from the prediction section, based on the attitude of the image pickup device detected by the detection step; a conversion step for converting each output in the signal processing step into a command signal associated with the first direction and a command signal associated with the second direction; and a control step for outputting to the drive section a rotation drive command associated with the first direction and a rotation drive command associated with the second direction, respectively, based on each output in the conversion step, wherein the specified cut-off frequency for the first directional component in the signal processing step is lower than that for the second specified directional component.

In a ninth aspect of the present invention, there is provided an shooting direction control method of an image pickup device that changes the shooting direction of the image pickup device, which has a drive section arranged to rotate the image pickup device in a first direction and a second direction orthogonal to the first direction, respectively, comprising: a prediction step for predicting the movement of an object to be shot by the image pickup device; a decomposition step for decomposing a prediction signal in the prediction step into a component associated with the first direction and a component associated with the second direction; a first signal processing step for cutting a component higher than a specified cut-off frequency in components associated with the first direction; a second signal processing step for cutting a component higher than a specified cut-off frequency in components associated with the second direction; a detection step for detecting the attitude of the image pickup device; a conversion step for converting the output in the first signal processing step and the output in the second signal processing step into a command signal associated with the first direction and a command signal associated with the second direction, respectively, based on the attitude of the image pickup device detected by the detection step; and a control step for outputting to the each drive section a rotation drive command associated with the first direction and a drive command associated with the second direction, respectively, based on each output in the conversion step, wherein the specified cut-off frequency in the first signal processing step is lower than that in the second signal processing step.

In a tenth aspect of the present invention, there is provided an shooting direction control method of an image pickup device that changes the shooting direction of the image pickup device having a drive section arranged to rotate the image pickup device in a first direction and a second direction orthogonal to the first direction, respectively, comprising: a command step for issuing a directive on a rotation target angle of the image pickup device associated with the first direction and a rotation target angle of the image pickup device associated with the second direction; a first dead band step for setting a dead band width in a command signal associated with the first direction in the command step; a second dead band step for setting a dead band width in a command signal associated with the second direction in the command step; and a control step for outputting to the drive section a rotation drive command associated with the first direction and a rotation drive command associated with the second direction, respectively, based on each output in the first dead band step and the second dead band step, wherein the dead band width in the first dead band step is wider than that in the second dead band step.

In an eleventh aspect of the present invention, there is provided an program which causes a computer to implement the above-mentioned shooting direction control method of the image pickup device.

According to the present invention, the cut-off frequency of the command of a first directional component is set to become lower than that of the command of a second directional component, which is orthogonal to the first direction. Accordingly, when the first direction includes a vertical direction and the second direction includes a horizontal direction, it is possible to limit the movement in the vertical direction of the image pickup device more than the movement in the horizontal direction. More specifically, by focusing attention on the anisotropy of human dynamic visual acuity, in which one is resistant to an object moving from side to side, and is vulnerable to an object moving up and down, it is possible to obtain images to be observed without giving a sense of discomfort to an observer, while moving as fast as possible. This allows the image pickup device to obtain moving images suitable for a person to observe, at the time of automatic tracking in particular.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing preferred embodiment thereof.

First Embodiment

Figure 1:
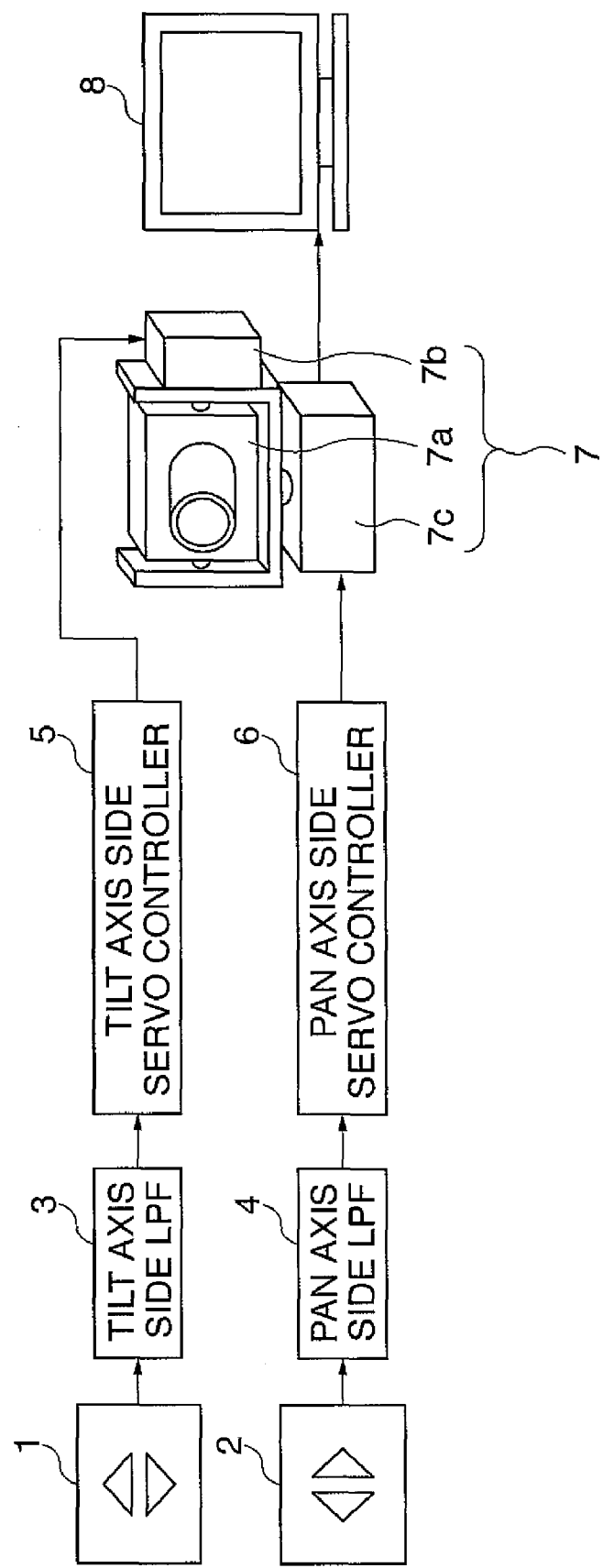
FIG. 1 is a block diagram showing the configuration of an image pickup system according to a first embodiment of the present invention.
Figure 2:
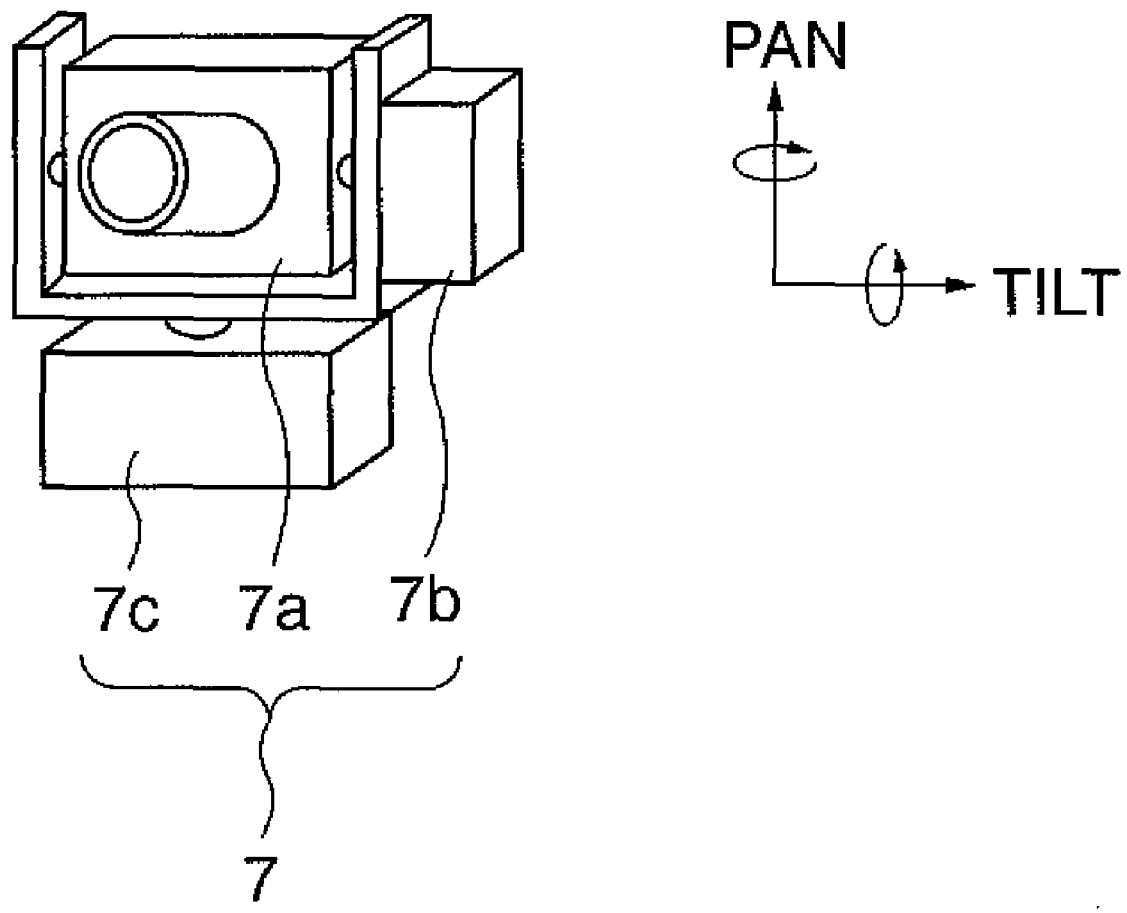
FIG. 2 is a perspective view showing the appearance of a video camera device in FIG. 1.

FIG. 1 is a block diagram showing the configuration of an image pickup system according to a first embodiment of the present invention. FIG. 2 is a perspective view showing the appearance of a video camera device in FIG. 1.

In FIGS. 1 and 2, the image pickup system according to a first embodiment of the present invention comprises a tilt axis side angle command input section 1, a tilt axis side low-pass filter (tilt axis side LPF) 3 and a tilt axis side servo controller 5. The image pickup system further comprises a pan axis side angle command input section 2, a pan axis side low-pass filter (pan axis side LPF) 4, a pan axis side servo controller 6, a video camera device 7 (a video camera 7a, a tilt axis drive mechanism 7b. and a pan axis drive mechanism 7c) and an image display 8. It should be noted that, among the components described above, components that "tilt axis side" and "pan axis side" precede may be hereinafter denoted with "tilt axis side" and "pan tilt side" omitted. This is also applied to the description of the other embodiments of the present invention.

The video camera device 7 is arranged to be capable of pivoting vertically and horizontally by a tilt actuator and a pan actuator, respectively, whose rotating shafts are orthogonal to each other, therefore, to be capable of changing its shooting direction. The video camera 7a. shoots the image of a subject situated in the direction (tilt direction/pan direction) toward which the camera was driven. The image display 8 displays the shot image. The tilt axis drive mechanism 7b. comprises the tilt actuator for rotating the video camera 7a. around its horizontal axis (in the tilt direction), a drive circuit and a sensor for detecting the angle in the tilt direction of the video camera 7a.

The pan axis drive mechanism 7c. comprises the pan actuator for rotating the video camera 7a. around its vertical axis (in the pan direction), a drive circuit and a sensor for detecting the angle in the pan direction of the video camera 7a. The image display 8 can display the image shot by the video camera 7a. in real time or after the image is stored in a recording medium.

The angle command input section 1 is operated to issue a directive on the target angle in the tilt direction of the video camera 7a. The angle command input section 2 is operated to issue a directive on the target angle in the pan direction of the video camera 7a. The present embodiment is described by taking a case an example where the angle command input sections 1 and 2 are push switches, although not limited thereto. For example, a mouse, a joystick and a volume controller may be used as the angle command input sections 1 and 2. Alternatively, the target angles of the tilt and pan directions may be entered numerically from the outside of the image pickup system via a communication line.

The low-pass filter 3 cuts high frequency components of signals entered from the angle command input section 1. The low-pass filter 4 cuts high frequency components of signals entered from the angle command input section 2. For example, if an input signal is an analog signal, a configuration can be considered that an integrator filter using a capacitor or a resistor is used as the low-pass filters 3 and 4. For example, if an input signal is a digital signal, a finite impulse response filter in FIG. 4 and an infinite impulse response filter in FIG. 5, which are described later, are used as the low-pass filters 3 and 4.

The servo controller 5 controls the tilt axis drive mechanism 7b. based on a tilt control command signal entered through the low-pass filter 3. The servo controller 6 controls the pan axis drive mechanism 7c. based on a pan control command signal entered through the low-pass filter 4. As the servo controllers 5 and 6, for example, a configuration shown in FIG. 3 can be considered, which will be described later.

In the present embodiment, a cut-off frequency fct of the low-pass filter 3 (vertical directional component) associated with the tilt axis drive mechanism 7b. is set to become lower than a cut-off frequency fcp of the low-pass filter 4 (horizontal directional component) associated with the pan axis drive mechanism 7c. Incidentally, at least two sets of cut-off frequencies of the vertical and horizontal components are stored in a memory unit (not shown), and can be changed by a predetermined operation so that they can be changed according to the situation of an object to be shot and the preference of a user.

Figure 3:
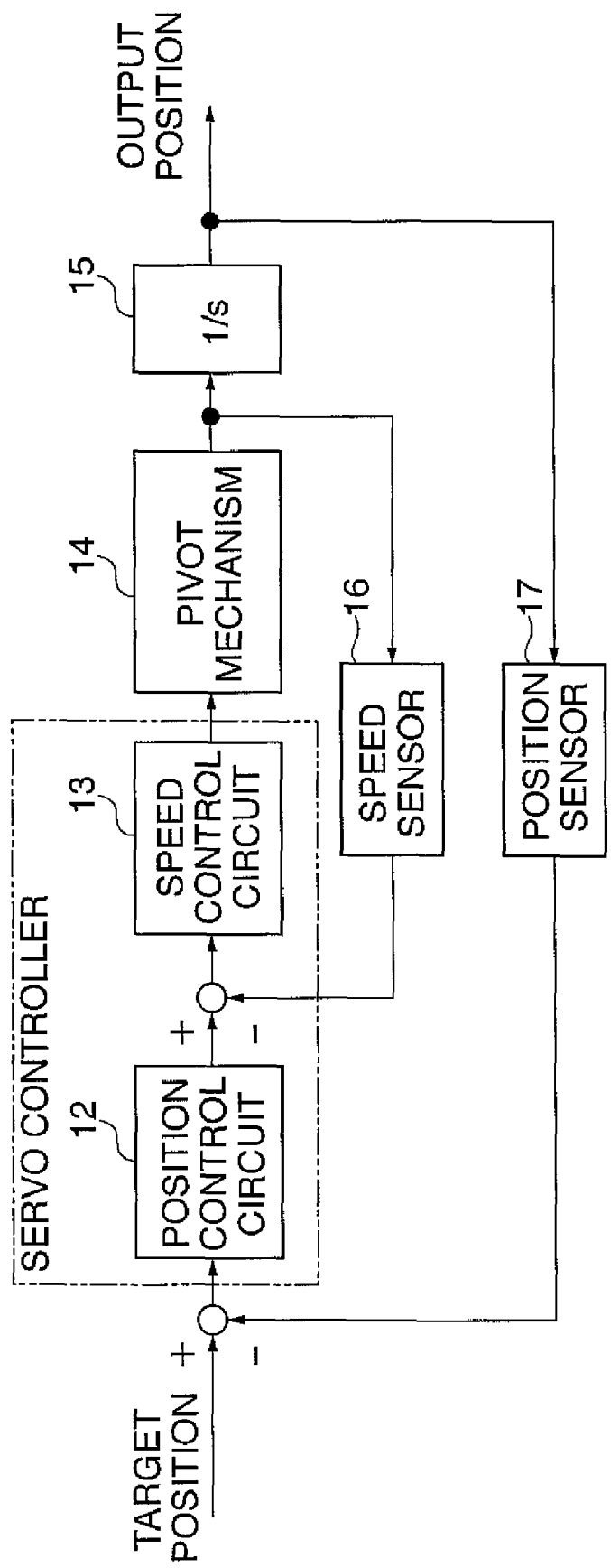
FIG. 3 is a block diagram showing the configuration of a position control system and a speed control system, including a servo controller in FIG. 1.

FIG. 3 is a block diagram showing the configuration of a position control system and a speed control system, including servo controllers 5 and 6 in FIG. 1.

In FIG. 3, the servo controllers 5 and 6 each comprise a position control circuit 12 and a speed control circuit 13. In the other words, this configuration is provided for each of the servo controller 5 and 6. For the servo controller 5, a pivot mechanism 14 corresponds to the tilt axis drive mechanism 7b, on the other hand, for the servo controller 6, the pivot mechanism 14 corresponds to the pan axis drive mechanism 7c.

A speed sensor 16 detects the pivot speed of the video camera 7a. at the time of a tilt pivot/pan pivot. A position sensor 17 detects the position of the video camera 7a. The position control circuit 12 issues a speed command to the speed control circuit 13 based on a difference between the target position of the video camera 7a. and the actual position of the video camera 7a. that was measured by the position sensor 17.

The speed command circuit 13 controls the pivot mechanism 14 by voltage or Pulse Width Modulation (PWM) output, based on the speed command that was issued by the position control circuit 12 and the actual speed of the video camera 7a. that was measured by the speed sensor 16. An integral element 15 converts the speed into a position. The above configuration allows the position of the video camera 7a. to follow the target position.

Although a double loop configuration consisting of a speed control loop and a position control loop is shown in FIG. 3, only the position control loop may be used depending on goals and components. In addition, an acceleration=power loop (current loop for a DC motor) may be added as a minor loop to the speed control loop and the position control loop. Further, although two sensors, the speed sensor 16 and the position sensor 17 are provided on the configuration in FIG. 3, one of the sensors may be substituted by a speed sensor + an integration circuit or a position sensor + a differentiation circuit.

It should be noted that, if an open-driven stepping motor is used in each actuator of the tilt axis drive mechanism 7b. and the pan axis drive mechanism 7c, the tilt axis drive mechanism 7b. and the pan axis drive mechanism 7c. need no sensor. In this case, a pulse generator may be used instead of each servo controller.

Figure 4:
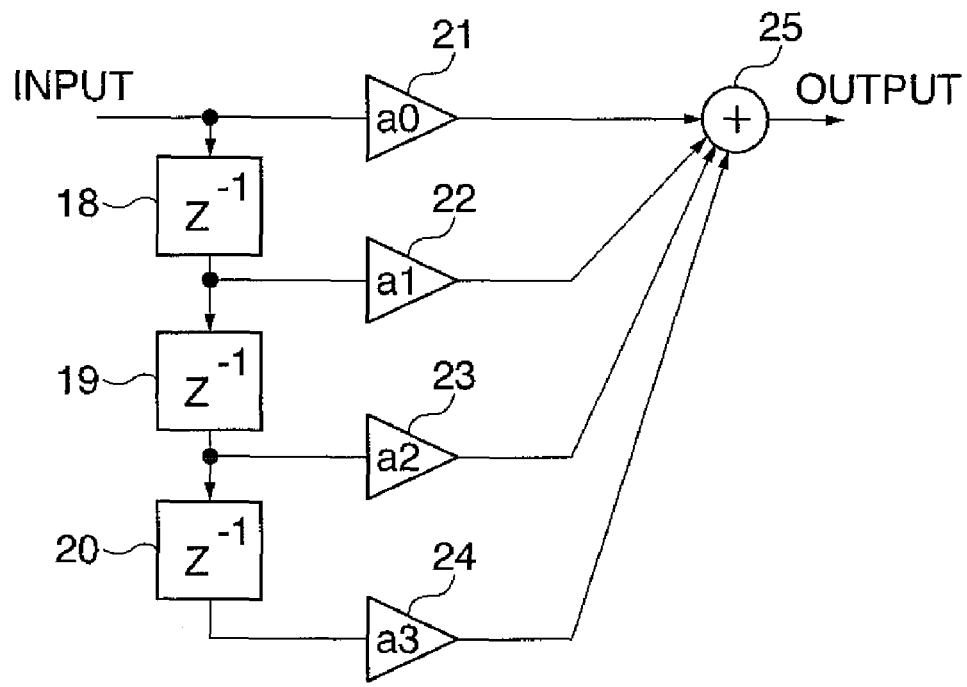
FIG. 4 is a view showing the configuration of a finite impulse response filter as an example of constructing a low-pass filter in FIG. 1.
Figure 5:
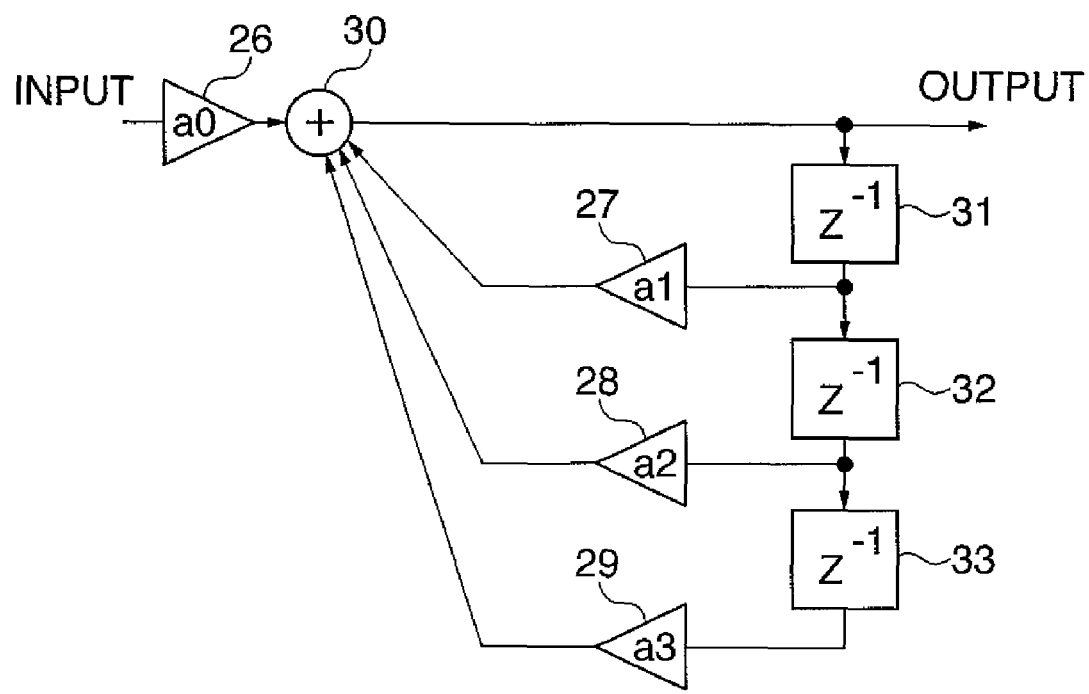
FIG. 5 is a view showing the configuration of an infinite impulse response filter as another example of constructing a low-pass filter in FIG. 1.
Figure 6:
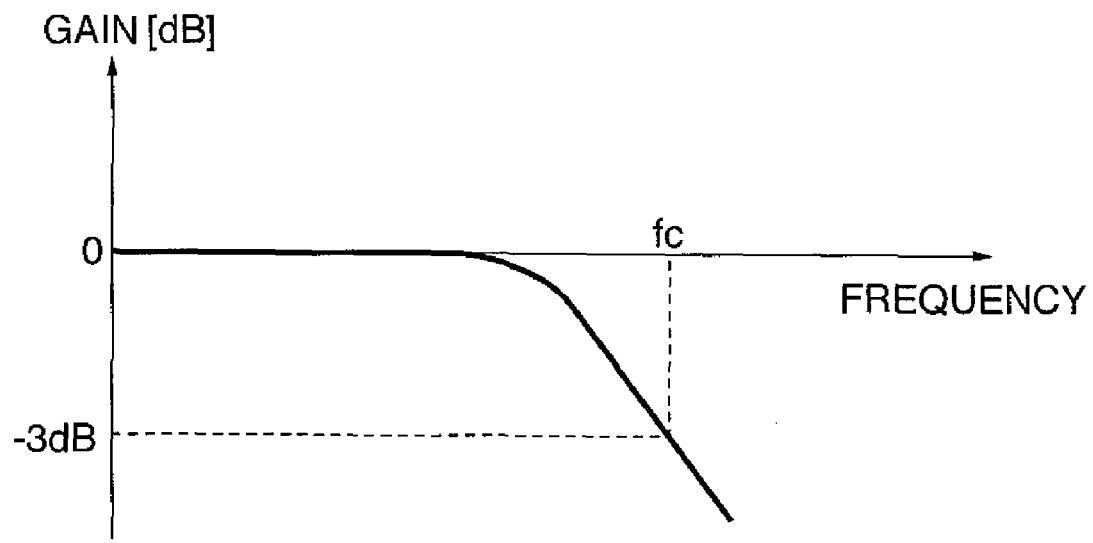
FIG. 6 is a graph showing the frequency response characteristic of the low-pass filter, which constructs the low-pass filter in FIG. 1.

FIG. 4 is a view showing the configuration of a finite impulse response filter as an example of constructing low-pass filters 3 and 4 in FIG. 1. FIG. 5 is a view showing the configuration of an infinite impulse response filter as another example of constructing low-pass filters 3 and 4 in FIG. 1. FIG. 6 is a graph showing the frequency response characteristic of the low-pass filter.

In FIG. 4, delay elements 18 to 20 cause a delay in a certain sampling time. Multipliers 21 to 24 multiply their inputs by weighting factors a0 to a3. These weighting factors are set to meet a prescribed condition, a0+a1+a2+a3=1. An adder 25 adds up each output of the multipliers 21 to 24. In FIG. 5, delay elements 31 to 33 cause a delay in a certain sampling time. Multipliers 26 to 29 multiply their inputs by weighting factors a0 to a3. These weighting factors are set to meet a prescribed condition, a0+a1+a2+a3=1. An adder 30 adds up each output of the multipliers 26 to 29.

The filters shown in FIGS. 4 and 5 present their low-pass filter characteristics that pass only low frequencies as shown in FIG. 6 if the weighting factor is positive. Here, fc is a frequency whose gain is −3. dB, that is, whose output amplitude is about 70% relative to its input. Both the above low-pass filters 3 and 4 are designed to present their low-pass characteristics.

Figure 7:
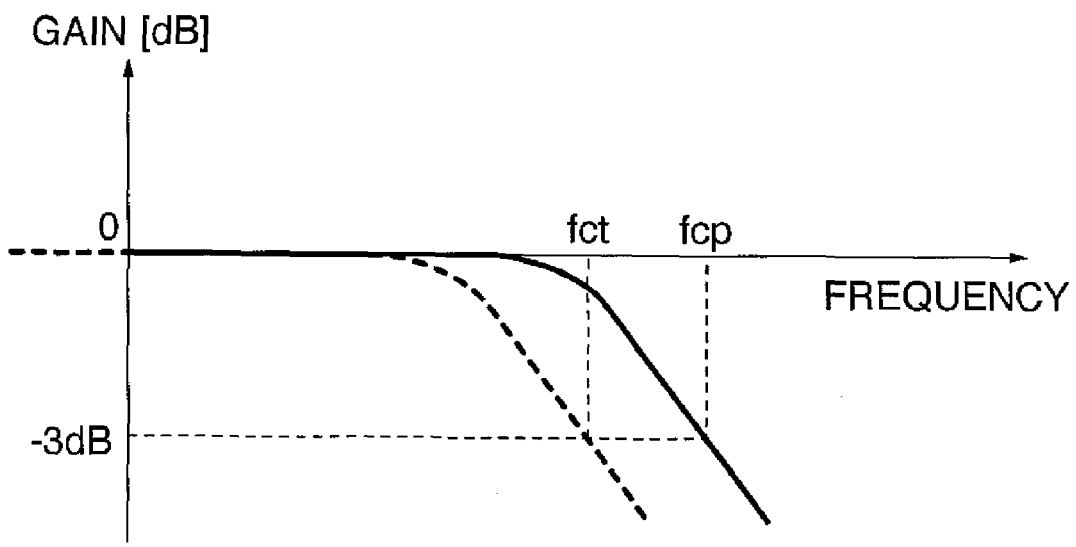
FIG. 7 is a graph showing each frequency response characteristic of the pan axis side low-pass filter and the tilt axis side low-pass filter in FIG. 1.

FIG. 7 is a graph showing each frequency response characteristic of the pan axis side low-pass filter and the tilt axis side low-pass filter in FIG. 1.

In FIG. 7, the solid line indicates the frequency response characteristic of the pan axis side low-pass filter 4, and fcp indicates its cut-off frequency. In addition, the dotted line indicates the frequency response characteristic of the tilt axis side low-pass filter 3, and fct indicates its cut-off frequency. In the present embodiment, the cut-off frequency fct of the low-pass filter 3 associated with the tilt axis drive mechanism 7b. is always set to become lower than the cut-off frequency fcp of the low-pass filter 4 associated with the pan axis drive mechanism 7c. More specifically, the cut-off frequencies are set to be fct<fcp. This effect will be described below.

Figure 8:
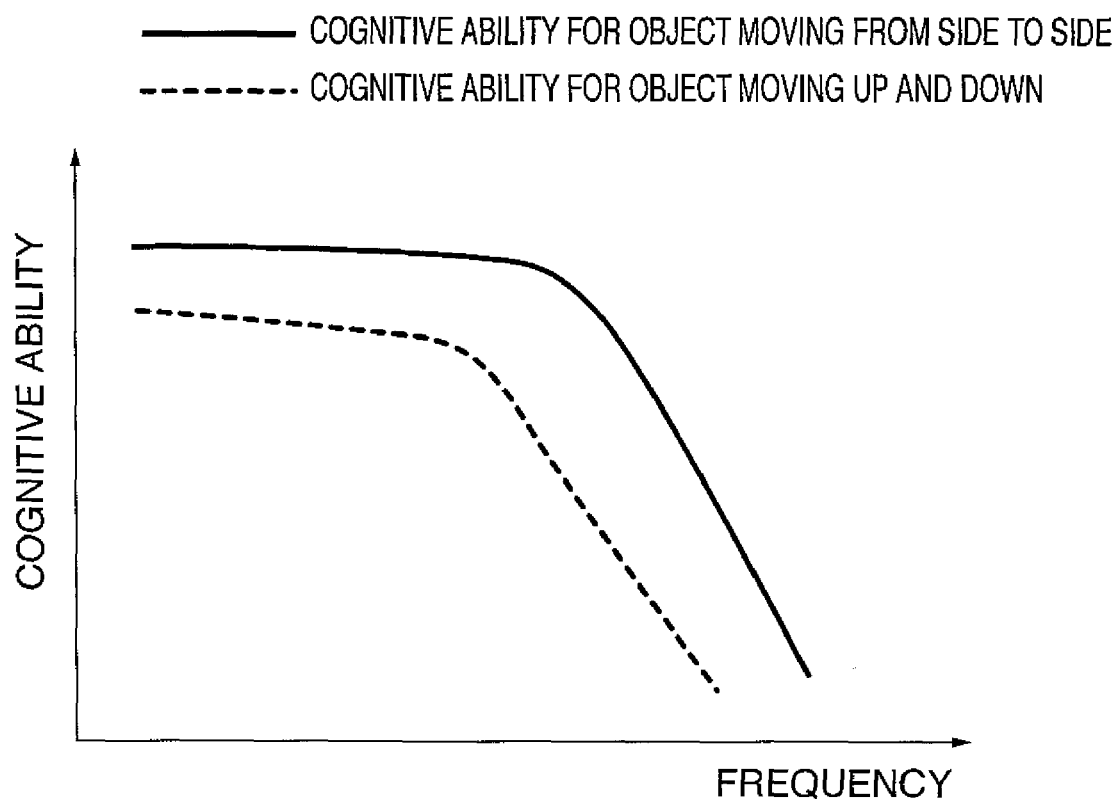
FIG. 8 is a graph showing human cognitive ability for objects that are moving.
Figure 9:
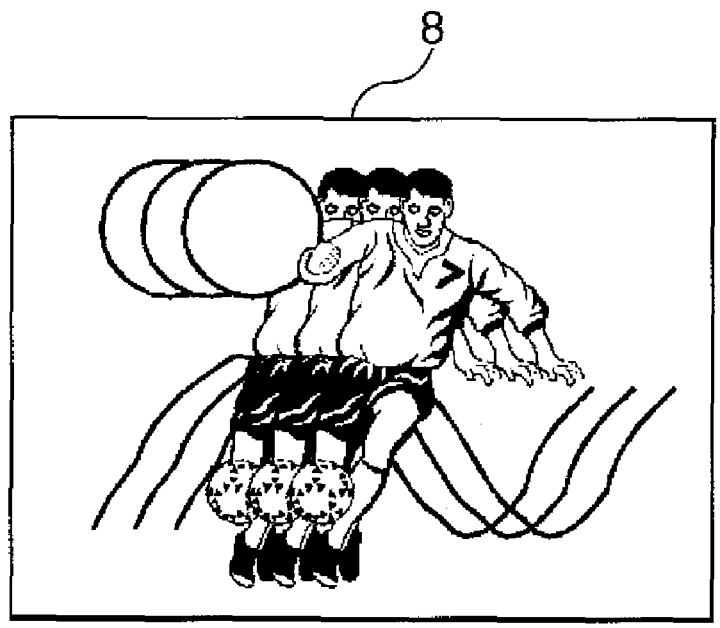
FIG. 9 is a view showing an image that is observed when the video camera is driven from side to side.
Figure 10:
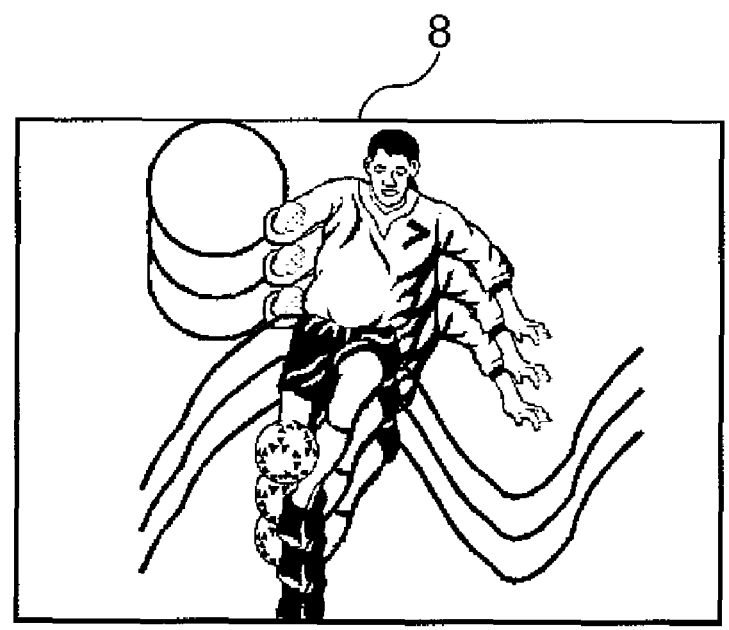
FIG. 10 is a view showing an image that is observed when the video camera is driven up and down.

FIG. 8 is a graph showing human cognitive ability for objects that are moving. FIG. 9 is a view showing an image that is observed when the video camera is driven from side to side. FIG. 10 is a view showing an image that is observed when the video camera is driven up and down.

In FIG. 8, the solid line indicates human cognitive ability for objects that are moving from side to side, and the dotted line indicates human cognitive ability for objects that are moving up and down. This is caused because one is usually resistant to an object moving from side to side, and is vulnerable to an object moving up and down, and therefore, it is difficult to recognize the object moving up and down. According to the present embodiment, as described later, the drive of the video camera is controlled by focusing attention on the anisotropy of human dynamic visual acuity (a characteristic that one is resistant to an object moving from side to side, and is vulnerable to an object moving up and down).

On the other hand, when the video camera 7a is driven from side to side (in the horizontal direction) by the pan axis drive mechanism 7c, the image on the image display 8 moves as shown in FIG. 9. When the video camera 7a. is driven up and down (in the vertical direction) by the tilt axis drive mechanism 7b, the image on the image display 8 moves as shown in FIG. 10. In particular, when the image moves fast up and down as shown in FIG. 10, human eyesight is worse than the case shown in FIG. 9, and an observer therefore feels unpleasantness.

In addition, as shown in "Illustrated Ergonomics" (Japan Standard Association pp. 292, FIG. 4.4.8), human field of view has also anisotropy, and the field of view of the vertical direction is narrower than that of the horizontal direction. For example, effective field of view, which represents a range that one can accept particular information among other information in a moment, is ±15. degrees for horizontal direction, on the other hand, +8. degrees and −12 degrees for vertical direction. As a result, vertical movement frequently causes fast movement of the eyes called saccade movement, or head movement, which causes unpleasantness on a short-term basis, and fatigue on a long-term basis.

On the other hand, since it is desired that the movement of the camera reaches a target position earlier, it is recommended that, to the extent that one does not feel unpleasantness, a limit is placed on the operation of the camera in the horizontal (pan) direction, which has a little effect on persons. On the other hand, a limit should be placed on the operation of the camera in the vertical (tilt) direction.

Figure 11:
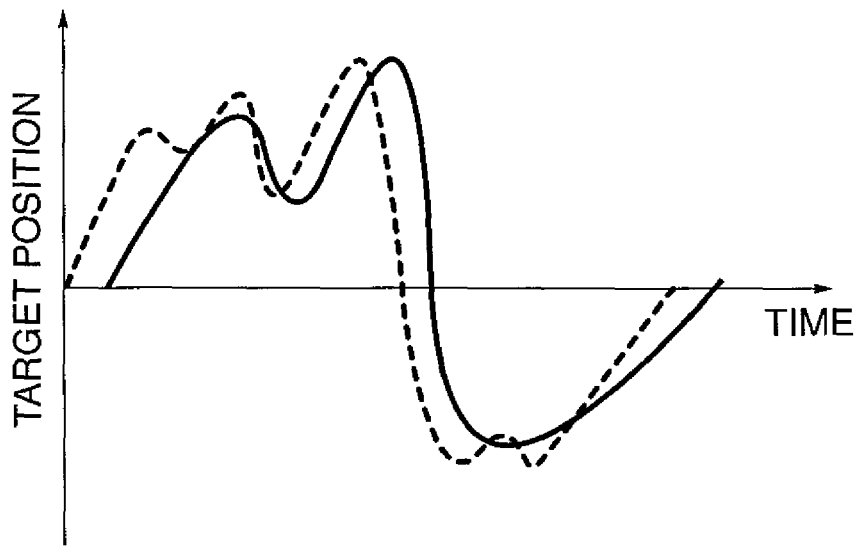
FIG. 11 is a graph showing the movement of the camera in the pan axis direction in response to a command value.
Figure 12:
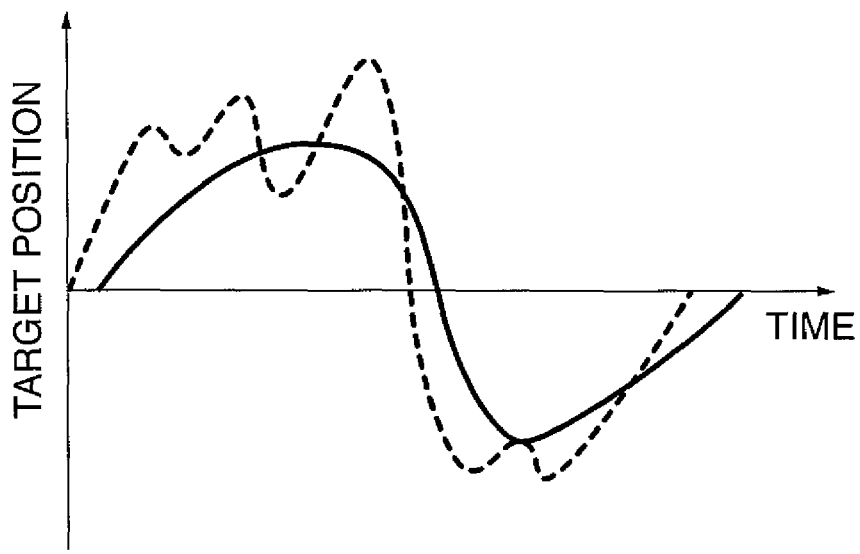
FIG. 12 is a graph showing the movement of the camera in the tilt axis direction in response to a command value.

According to the present embodiment, as described above, the low-pass filters 3 and 4 are provided to be associated with the drive commands to the video camera 7a. of the vertical directional component, that is, the tilt axis, and the horizontal vertical directional component, that is, the pan axis, respectively. In addition, any high frequency component is eliminated so that the cut-off frequency of the drive command of the tilt axis becomes lower than that of the drive command of the pan axis, before the tilt actuator and the pan actuator are driven. FIGS. 11 and 12 show a difference between movement in the pan axis direction and movement in the tilt axis direction of the video camera 7a.

FIG. 11 is a graph showing the movement of the video camera 7a. in the pan axis direction in response to a command value. FIG. 12 is a graph showing the movement of the video camera 7a. in the tilt axis direction in response to a command value.

In FIG. 11, the dotted line indicates a signal generated with the operation of the angle command input section 2, and the solid line indicates the actual movement of the video camera 7a. in the pan axis direction in response to the command value. Further, in FIG. 12, the dotted line indicates a signal generated with the operation of the angle command input section 1, and the solid line indicates the actual movement of the video camera 7a. in the tilt axis direction in response to the command value. The video camera 7a. in the pan axis direction has high trackability as shown in FIG. 11. In addition, the video camera 7a. drives in the tilt direction more smoothly. This makes it possible to prevent an observer from feeling unpleasantness when observing shot images on the image display 8, while keeping the trackability of the video camera 7a. for the target position wherever possible.

As described above, according to the present embodiment, by focusing attention on the anisotropy of human dynamic visual acuity, the image pickup system capable of changing the shooting direction of the video camera can obtain images to be observed without giving a sense of discomfort to an observer, while moving as fast as possible. This allows the image pickup device to obtain moving images suitable for a person to observe, at the time of automatic tracking in particular.

Second Embodiment

Figure 13:
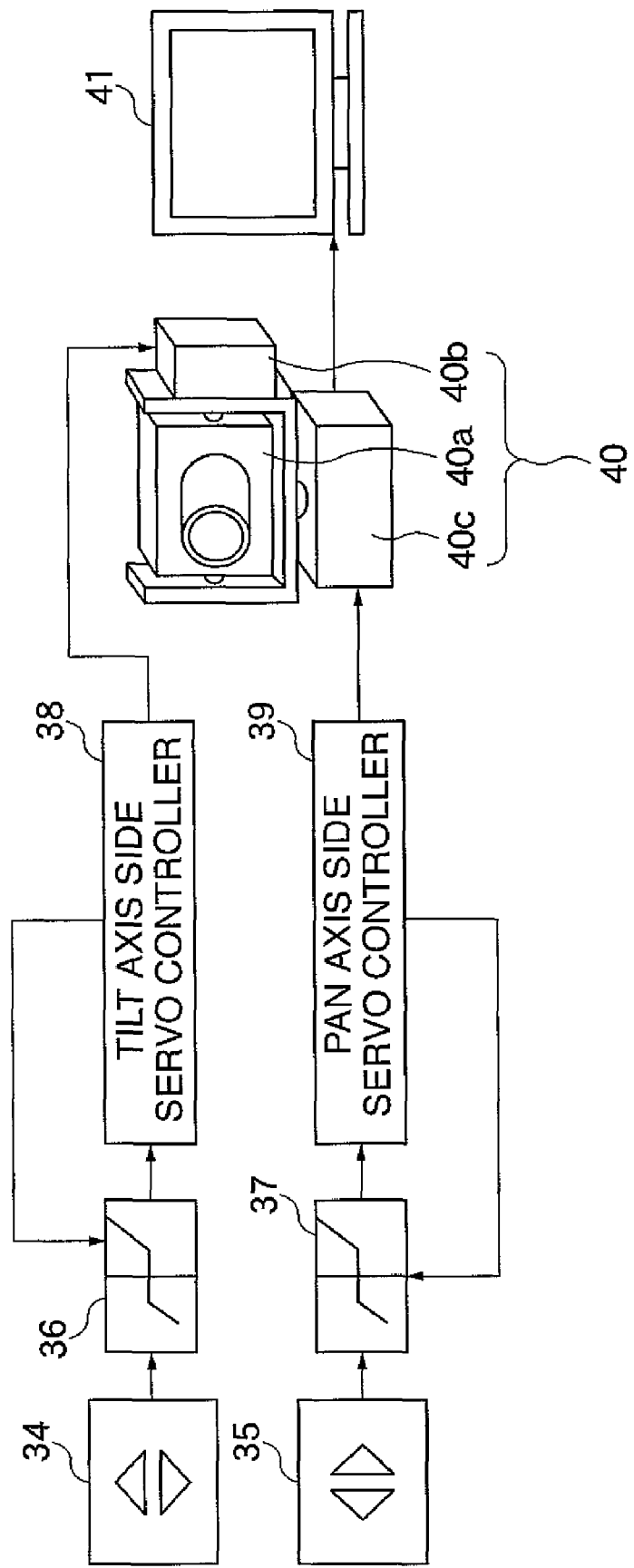
FIG. 13 is a block diagram showing the configuration of an image pickup system according to a second embodiment of the present invention.

FIG. 13 is a block diagram showing the configuration of an image pickup system according to a second embodiment of the present invention.

In FIG. 13, the image pickup system according to a second embodiment of the present invention comprises an angle command input section 34, a dead zone element 36, a tilt axis side servo controller 38, an angle command input section 35, a dead band element 37 and a pan axis side servo controller 39. The image pickup system further comprises a video camera device 40 (video camera 40a, tilt axis drive mechanism 40b. and a pan axis drive mechanism 40c) and an image display 41.

The present embodiment is distinguished from the above first embodiment in that the dead band elements 36 and 37 are provided. Other components of the present embodiment are identical to corresponding components of the above first embodiment (FIG. 1), and therefore description thereof is omitted.

The dead band element 36 obtains the angle information of the tilt axis that is entered from a position sensor (not shown) to the servo controller 38, and calculates a difference between the obtained angle information and the command value that is entered from the angle command input section 34. The dead band element 36 also enables the output of the servo controller 38 when the calculated difference is greater than or equal to a predetermined value. The dead band element 37 obtains the angle information of the pan axis that is entered from the position sensor (not shown) to the servo controller 39, and calculates a difference between the obtained angle information and the command value that is entered from the angle command input section 35. The dead band element 37 also enables the output of the servo controller 39 when the calculated difference is greater than or equal to a predetermined value.

The dead band width of the dead band element 36 associated with the tilt axis drive mechanism 40b. is set to be wider than that of the dead band element 37 associated with the pan axis drive mechanism 40c. Usually, mechanical movement (e.g. manual angle designation) to set the position of the camera often presents first and second delay characteristics. If the amplitudes of the inputs are the same, the higher the frequency, the smaller the amplitude. This will be described below with respect to FIGS. 14 and 15.

According to the present embodiment, the vertical directional dead band width of the dead band element 36 associated with the tilt axis drive mechanism 40b. is set to be wider than the horizontal directional dead band width of the dead band element 37 associated with the pan axis drive mechanism 40c. Incidentally, at least two sets of vertical and horizontal directional dead band widths are stored in a memory unit (not shown), and can be changed by a predetermined operation so that they can be changed according to the situation of an object to be shot and the preference of a user.

Figure 14:
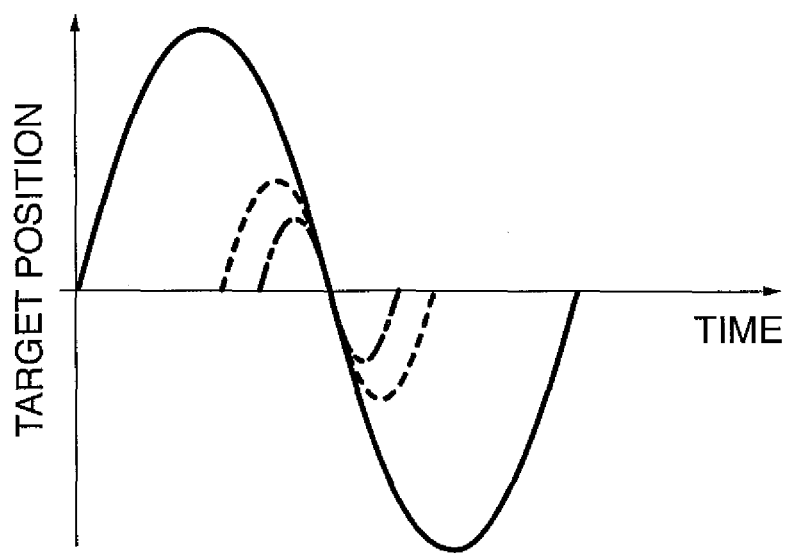
FIG. 14 is a graph showing the response of a general positioning system in a case where exciting forces are the same and the frequencies are different.
Figure 15:
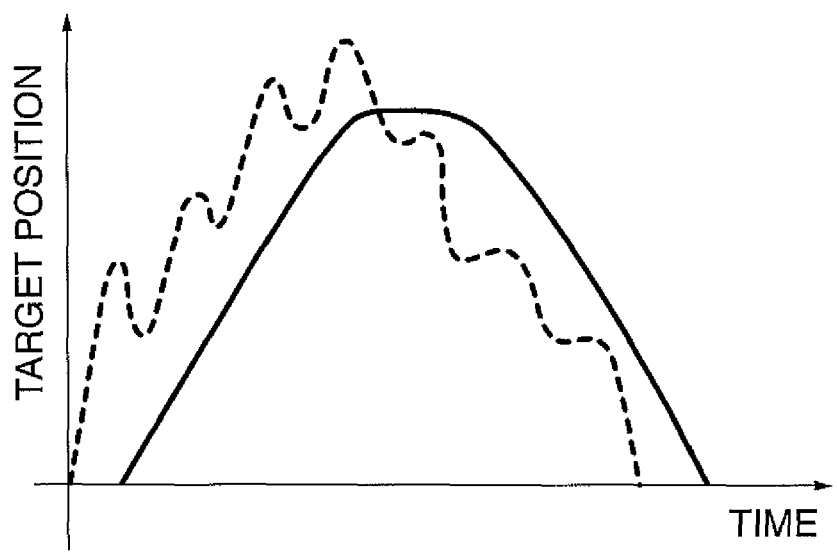
FIG. 15 is a graph showing an effect of removing parasitic oscillation by a dead band.

FIG. 14 is a graph showing the response of a general positioning system in a case where exciting forces are the same and the frequencies are different. FIG. 15 is a diagram showing an effect of removing parasitic oscillation by a dead band.

In FIGS. 14 and 15, as shown in FIG. 14, the higher the frequency, the smaller the oscillation amplitude, as indicated by the dotted and dashed lines. Accordingly, by providing a dead band, the parasitic oscillation having higher frequency than that of a main drive component can be eliminated, as shown in FIG. 15. The dotted line in FIG. 15 indicates a position command for the servo controller, and the solid line indicates a response when a dead band is provided. The wave of the characteristic shown by the dotted line represents parasitic oscillation. As a result, unpleasantness when the shot image is observed can be reduced. In addition, since it is highly likely that the lower the frequency, the larger the oscillation amplitude, the frequency component to be eliminated can be roughly changed depending on the width of the dead band.

According to the present embodiment, the dead band width of the dead band element 36 associated with the tilt axis is set to be wider than that of the dead band element 37 associated with the pan axis. More specifically, the dead band width of the angle input command of the vertical directional component is set to be wider than that of the angle input command of the horizontal directional component. This makes it possible to reduce unpleasantness when the shot image is observed without sacrificing trackability for objects to be shot wherever possible.

It should be noted that the dead band element, which is presented in the present embodiment, and the low-pass filters 3 and 4, which were presented in the first embodiment described above, may be used together. To that end, for example, in the configuration shown in FIG. 13, the low-pass filters 3 and 4 may be connected to the previous stage (or next stage) of the two dead band elements, respectively.

As described above, according to the present embodiment, by focusing attention on the anisotropy of human dynamic visual acuity, the image pickup system capable of changing the shooting direction of the video camera can obtain images to be observed without giving a sense of discomfort to an observer, while moving as fast as possible. This allows the image pickup device to obtain moving images suitable for a person to observe, at the time of automatic tracking in particular.

Third Embodiment

Figure 16:
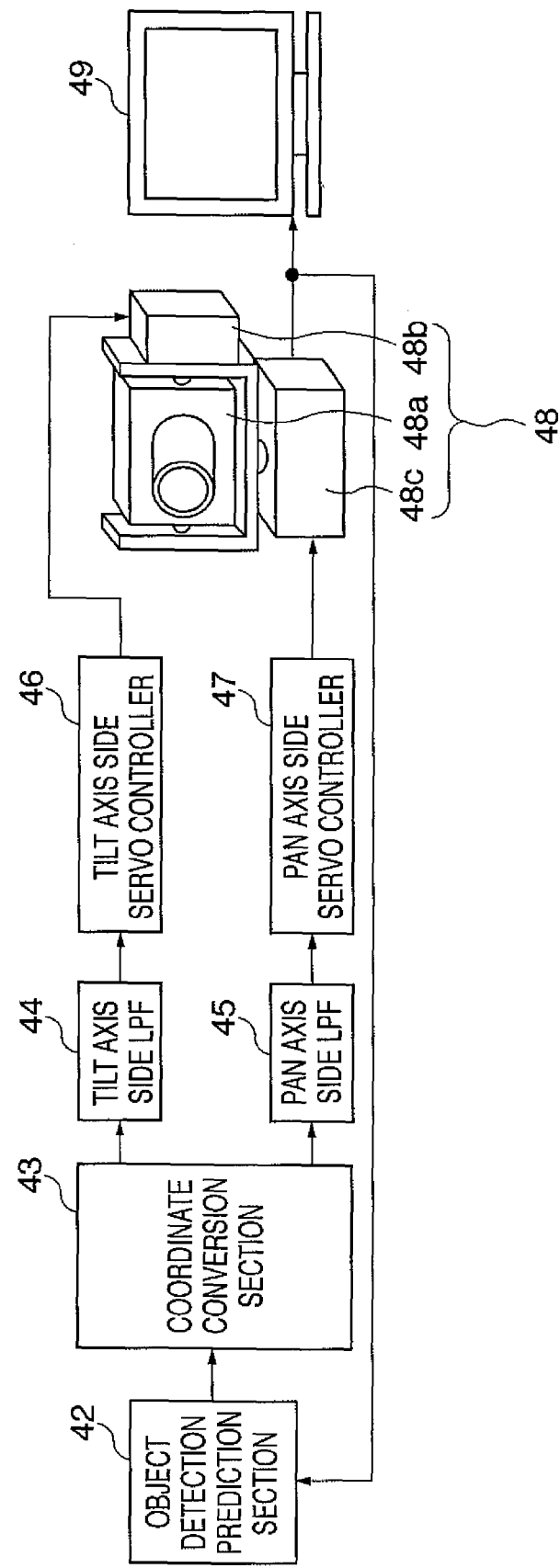
FIG. 16 is a block diagram showing the configuration of an image pickup system according to a third embodiment of the present invention.
Figure 17:
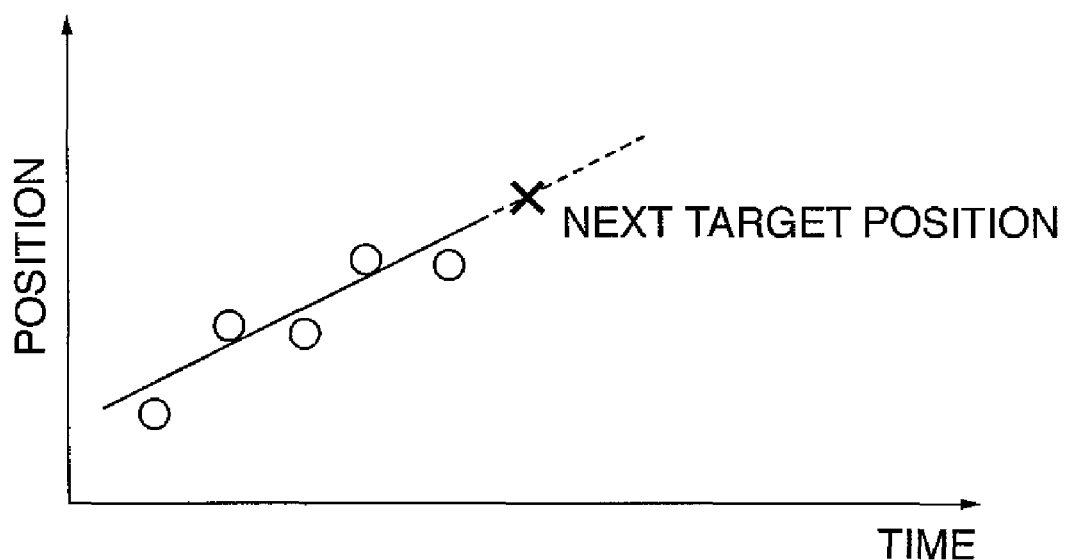
FIG. 17 is a graph showing the prediction of the position of an object by linearization.
Figure 18:
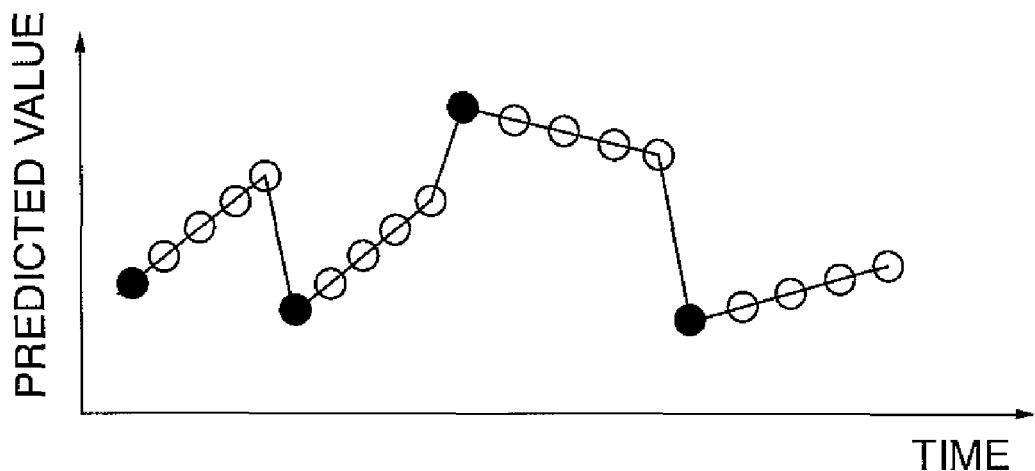
FIG. 18 is a graph showing the time-series change of predicted values in a case where image sampling is rough.
Figure 19:
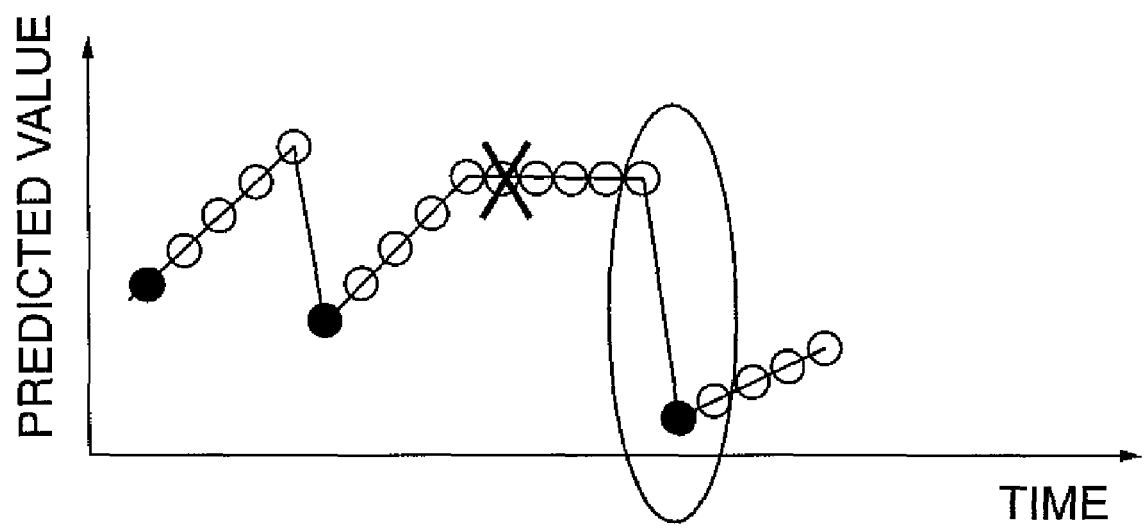
FIG. 19 is a graph showing the time-series change of the predicted values in a case where an object failed to be detected at the time of image sampling.

FIG. 16 is a block diagram showing the configuration of an image pickup system according to a third embodiment of the present invention. FIG. 17 is a diagram showing the prediction of the position of an object by linearization. FIG. 18 is a diagram showing the time-series change of predicted values in a case where image sampling is rough. FIG. 19 is a diagram showing the time-series change of the predicted values in a case where an object failed to be detected at the time of image sampling.

In FIG. 16, the image pickup system according to the third embodiment of the present invention comprises an object detection prediction section 42, a coordinate conversion section 43, a tilt axis side low-pass filter 44, a tilt axis side servo controller 46, a pan axis side low-pass filter 45 and a pan axis side servo controller 47. The image pickup system further comprises a video camera device 48 (video camera 48a, tilt axis drive mechanism 48b. and a pan axis drive mechanism 48c) and an image display 49.

The present embodiment is distinguished from the above first embodiment in that the object detection prediction section 42 and the coordinate conversion section 43 are provided. Other components of the present embodiment are identical to corresponding components of the above first embodiment (FIG. 1), and therefore description thereof is omitted.

The object detection prediction section 42 detects the position of an object (target object) on the display, such as a person, from an image that was shot by the video camera 48a, and predicts how the object moves, based on the detected data and previous data. Various prediction methods can be considered. For example, as shown in FIG. 17, the position of the object after a lapse of a predetermined time can be predicted by linearizing and extrapolating (extending a virtual line to a portion where data was not obtained: prediction) previous time-series data (indicated with circles). The object detection prediction section 42 outputs a prediction signal that indicates the predicted position of the detected object to the coordinate conversion section 43.

The coordinate conversion section 43 converts the signal into command values (for vertical direction and horizontal direction) corresponding to each of a tilt axis coordinate and a pan axis coordinate at the video camera 48a. so that the object comes to a predetermined position within the image. The coordinate conversion section 43 outputs the command values to the low-pass filters 44 and 45. The above process allows the video camera 48a. to perform automatic tracking so that an object such as a person comes to a predetermined position within the image.

For such a configuration shown in FIG. 16, the frequency of image update (video rate) is usually less than the frequency of the calculation of output values in the servo controller, 1/10 or less. Consequently, when the image is updated, the predicted position of the object changes drastically, and the time series of predicted values includes high frequencies as shown in FIG. 18. Note that white circles and black circles shown in FIG. 18 indicate the time series of the predicted values, the black circles representing points immediately after the object is detected from the image.

When tracking of an object is performed in natural environment, not in an artificial studio or the like, it is unavoidable that an object fails to be detected instantaneously due to the condition of ambient light or concealment of the object. For example, if even one frame of the image failed to be detected, it is highly likely that change in the target position is sharp as shown in an ellipse in FIG. 19 when the detection of the object gets recovered next time. Note that, as with FIG. 18, white circles and black circles shown in FIG. 19 indicate the time series of the predicted values, and a cross indicates a point immediately after an object failed to be detected at the time of image sampling.

If the oscillation of high frequency shown in FIG. 18 and sudden change in the predicted value shown in FIG. 19 are directly entered in the high-performance servo controller, the image to be observed is oscillated, which causes significant unpleasantness.

Therefore, the present embodiment implements low-pass filtering for the command values including the above parasitic oscillation (wave) to prevent small oscillation of an image obtained by the video camera 48a. In so doing, the movement of the image becomes smoother, due to the tilt axis side low-pass filter 44 cutting at a lower frequency than the pan side low-pass filter 45. In addition, the pan axis is set to have higher trackability than that of the tilt axis because human horizontal eyesight is better.

Such a setting is advantageous because the frequency of horizontal movement is high when the camera is used for tracking an object moving on the ground, such as a person. Further, differing from manual input, at the time of automatic tracking in particular, unintended movement is sometimes caused on the image, and it is therefore highly likely that a sense of discomfort occurs. Accordingly, it is very effective that the image pickup system according to the present embodiment is applied to an automatic tacking system.

In the present embodiment, the configuration that the low-pass filters are used for the image pickup system to apply to an automatic tracking system has been described, although not limited thereto. Like the above second embodiment, the dead band elements, each of which has different dead band width from each other, may be used, or both the low-pass filters and the dead band elements may be used.

As described above, according to the present embodiment, by focusing attention on the anisotropy of human dynamic visual acuity, the image pickup system capable of changing the shooting direction of the video camera can obtain images to be observed without giving a sense of discomfort to an observer, while moving as fast as possible. This allows the image pickup device to obtain moving images suitable for a person to observe, at the time of automatic tracking in particular.

Fourth Embodiment

Figure 20:
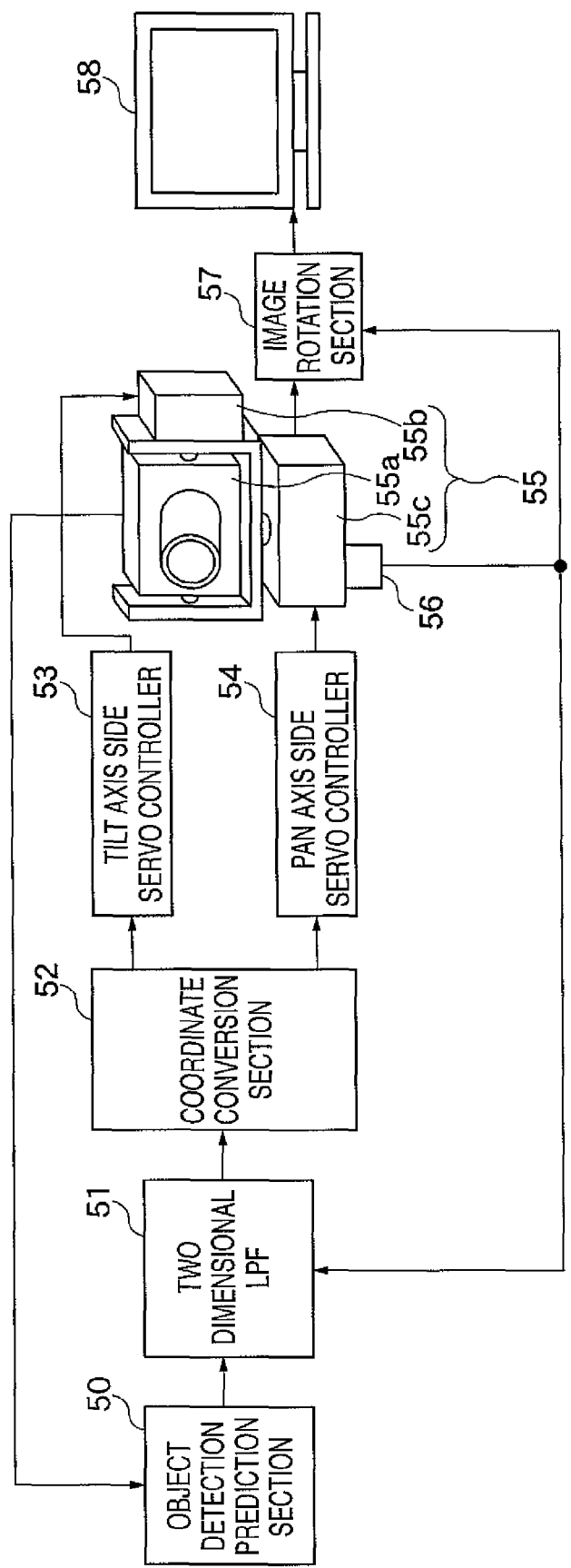
FIG. 20 is a block diagram showing the configuration of an image pickup system according to a fourth embodiment of the present invention.
Figure 21:
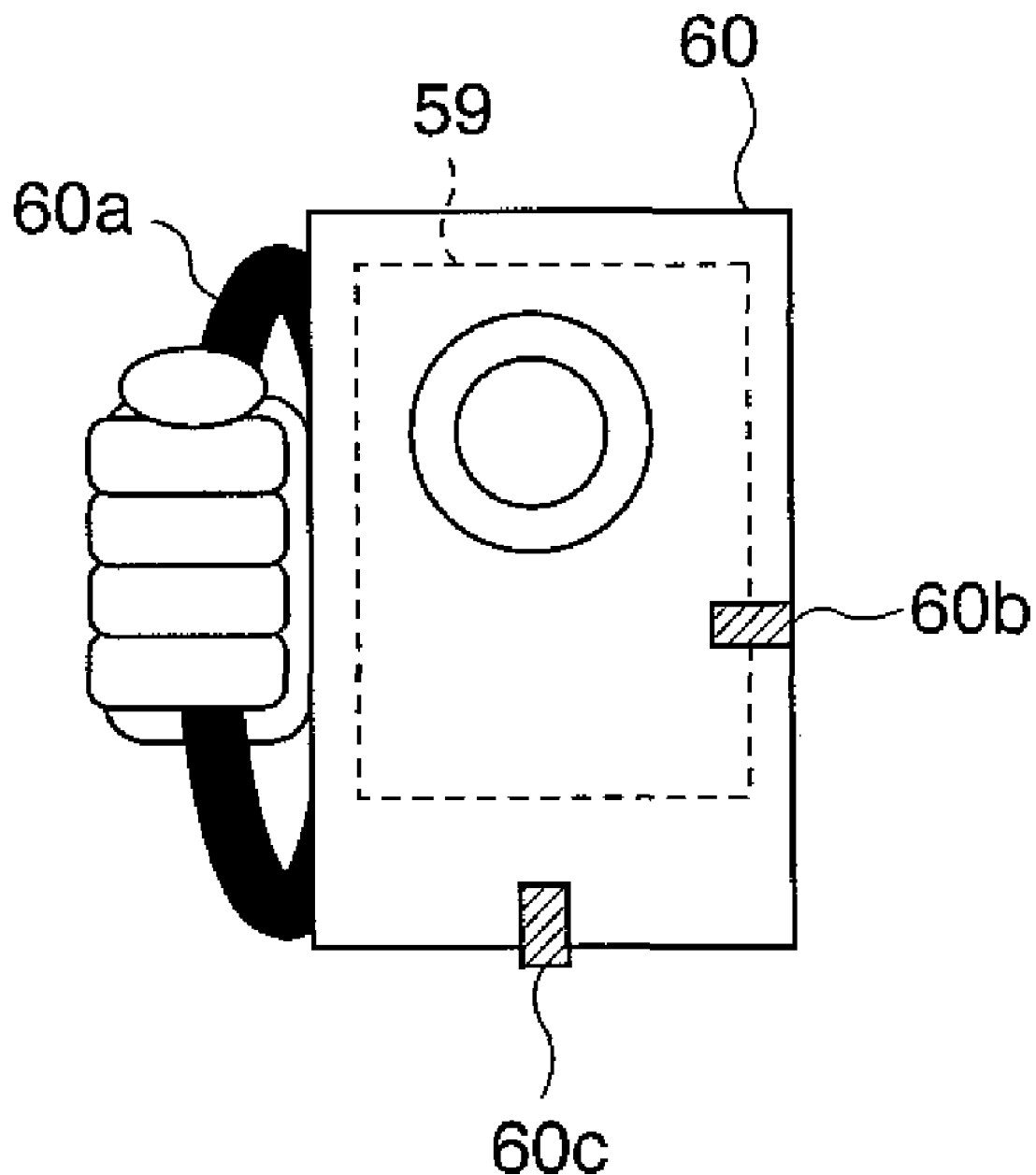
FIG. 21 is a view showing the appearance of a casing in which the video camera device or the like is housed.

FIG. 20 is a block diagram showing the configuration of an image pickup system according to a fourth embodiment of the present invention. FIG. 21 is a diagram showing the appearance of a casing in which the video camera device or the like is housed.

In FIGS. 20 and 21, the image pickup system comprises an object detection prediction section 50, a two dimensional low-pass filter 51, a coordinate conversion section 52, a tilt axis side servo controller 53 and a pan axis side servo controller 54. The image pickup system further comprises a video camera device 55 (video camera 55a, tilt axis drive mechanism 55b. and a pan axis drive mechanism 55c), an attitude detection sensor 56, an image rotation section 57 and an image display 58.

The present embodiment is distinguished from the above third embodiment in that the two dimensional low-pass filter 51, the attitude detection sensor 56 and the image rotation section 57 are provided. Other components of the present embodiment are identical to corresponding components of the above third embodiment (FIG. 16), and therefore description thereof is omitted.

A unit 59 comprising the object detection prediction section 50 to the image rotation section 57 of the image pickup system is housed in a casing 60 as shown in FIG. 21. The image rotation section 57 and the image display 58 within the casing 60 are connected wirelessly or via a wired line. The casing 60 of the image pickup system has a hand-held strap 60a. or setscrews 60b. and 60c. The attitude of the video camera 55a. can be changed by holding the strap 60a. by a hand, or the video camera 55a. can be secured to a tripod stand or the like by the setscrews 60b. and 60c, with the attitude of the video camera 55a. turned by a predetermined angle (for example 90. degrees).

The attitude detection sensor 56 detects the attitude of the secured portion of the video camera 55a, and outputs an attitude detection signal to the two dimensional low-pass filter 51 and the image rotation section 57. The two dimensional low-pass filter 51 implements low-pass filtering having each predetermined cut-off frequency for horizontal and vertical directional components in response to the output signal of the object detection prediction section 50, based on the attitude detection signal outputted by the attitude detection sensor 56. In this case, in the two dimensional low-pass filter 51, the cut-off frequency for the vertical directional component is set to become lower than the cut-off frequency for the horizontal directional component.

The signal, which was processed like the above, is entered in the coordinate conversion section 52, and converted into command values for the servo controllers 53 and 54, which control the tilt actuator and the pan actuator, respectively. The image rotation section 57 rotates the image so that the horizontal and vertical directions of the image are correctly displayed on the image display 58 according to the attitude of the video camera 55a. at the time of shoot, based on the attitude detection signal outputted by the attitude detection sensor 56. In other words, the image rotation section 57 rotates the image so that the vertical direction of the image displayed on the image display 58 corresponds to a vertical direction at the time of shoot.

According to the present embodiment, it is possible to shoot a tracked image, with unpleasantness at the time of observation reduced, while keeping tracking performance as much as possible, regardless of the attitude of the video camera 55a. at the time of shoot.

Next, the variations of the present embodiment will be described with reference to FIG. 22.

Figure 22:
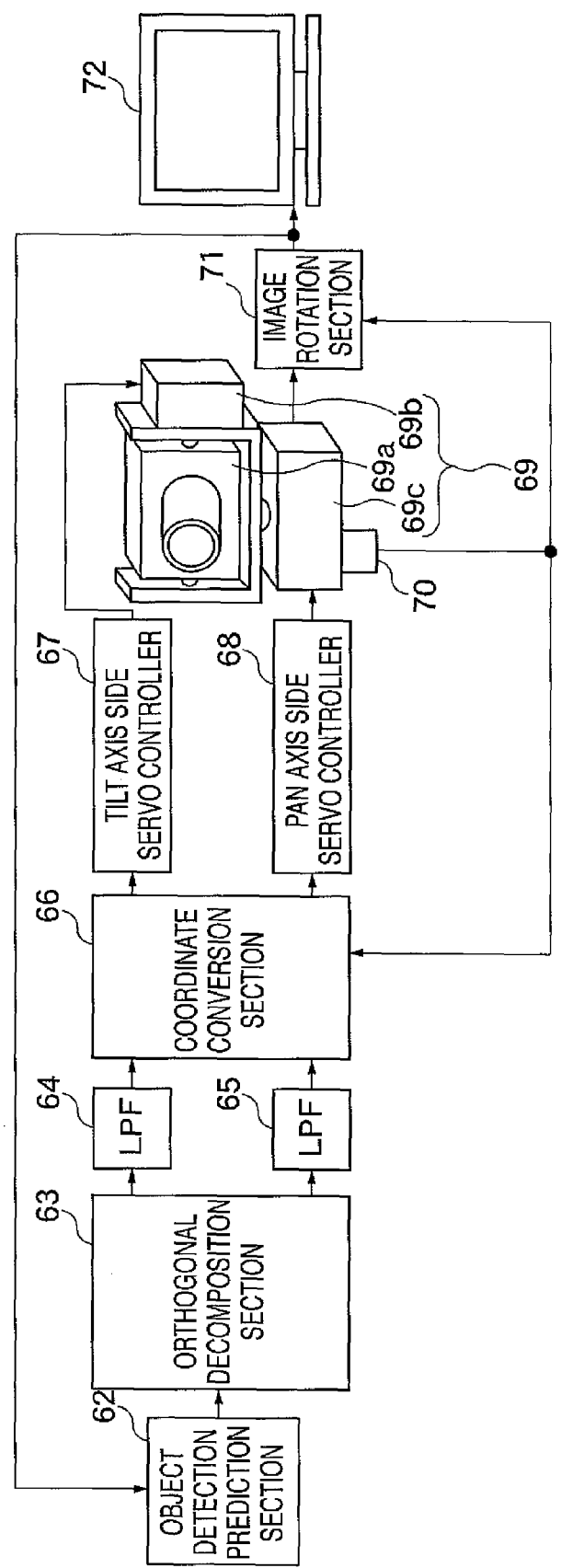
FIG. 22 is a block diagram showing the configuration of an image pickup system according to a variation of the fourth embodiment of the present invention.

FIG. 22 is a block diagram showing the configuration of an image pickup system according to a variation of the fourth embodiment of the present invention.

In FIGS. 22, the image pickup system according to the present variation comprises an object detection prediction section 62, an orthogonal decomposition section 63, low-pass filters 64 and 65, a coordinate conversion section 66, a tilt axis side servo controller 67 and a pan axis side servo controller 68. The image pickup system further comprises a video camera device 69 (video camera 69a, tilt axis drive mechanism 69b. and a pan axis drive mechanism 69c), an attitude detection sensor 70, an image rotation section 71 and an image display 72.

The present variation is distinguished from the present embodiment in that the orthogonal decomposition section 63 and the low-pass filters 64 and 65 are provided. Other components of the present variation are identical to corresponding components of the present embodiment (FIG. 20), and therefore description thereof is omitted.

The image signal is rotated by the image rotation section 71 so that the horizontal and vertical directions of the image correspond to those of an actual object, and is entered in the object detection prediction section 62. This has an advantage in that the detection of the object from the image, and the prediction of the movement thereof are facilitated because the image to be processed corresponds to its natural state. Incidentally, configuration that the attitude detection signal of the attitude detection sensor 70 is directly entered in the object detection prediction section 62, and used for the detection of the object or the position prediction thereof also provides the same advantage.

The object detection prediction section 62 outputs a prediction signal that indicates the predicted position of the detected object to the orthogonal decomposition section 63. The orthogonal decomposition section 63 decomposes the prediction signal into a horizontal component and a vertical component. If the object detection prediction section 62 detects the object by using an orthogonal coordinate system, the horizontal and vertical components are associated with the orthogonal coordinate system, and therefore, the orthogonal decomposition section 63 becomes unnecessary.

The low-pass filters 64 and 65 implement low-pass filtering for the vertical and horizontal directional components corresponding to target values, respectively. In this case, cut-off frequency of the low-pass filter 64 for the vertical component is set to become lower than that of the low-pass filter for the horizontal component. The low-pass filters 64 and 65 output signals that were low-pass filtered to the coordinate conversion section 66. The coordinate conversion section 66 converts the signals into the drive coordinate of the tilt actuator and pan actuator of the video camera 69a, based on the information from the attitude detection sensor 70, and outputs it to the servo controllers 67 and 68.

According to the present embodiment, it is possible to shoot a tracked image, with unpleasantness at the time of observation reduced, while keeping tracking performance as much as possible, regardless of the attitude of the video camera 69a.

Incidentally, the rotating shafts of the tilt actuator and the pan actuator of the video camera 69a may be disposed in any manner as long as they are not parallel to each other, and they need not be absolutely orthogonal to each other. Their coordinates can be decomposed onto a pre-designed rotating shaft by the coordinate conversion section 66.

In the present embodiment, the configuration that the low-pass filters are used for the image pickup system to apply to an automatic tracking system has been described, although not limited thereto. Like the above second embodiment, the dead band elements may be used, each of which has different dead band width from each other, or both the low-pass filters and the dead band elements may be used.

As described above, according to the present embodiment, by focusing attention on the anisotropy of human dynamic visual acuity, the image pickup system capable of changing the shooting direction of the video camera can obtain images to be observed without giving a sense of discomfort to an observer, while moving as fast as possible. This allows the image pickup device to obtain moving images suitable for a person to observe, at the time of automatic tracking in particular.

Fifth Embodiment

Figure 23:
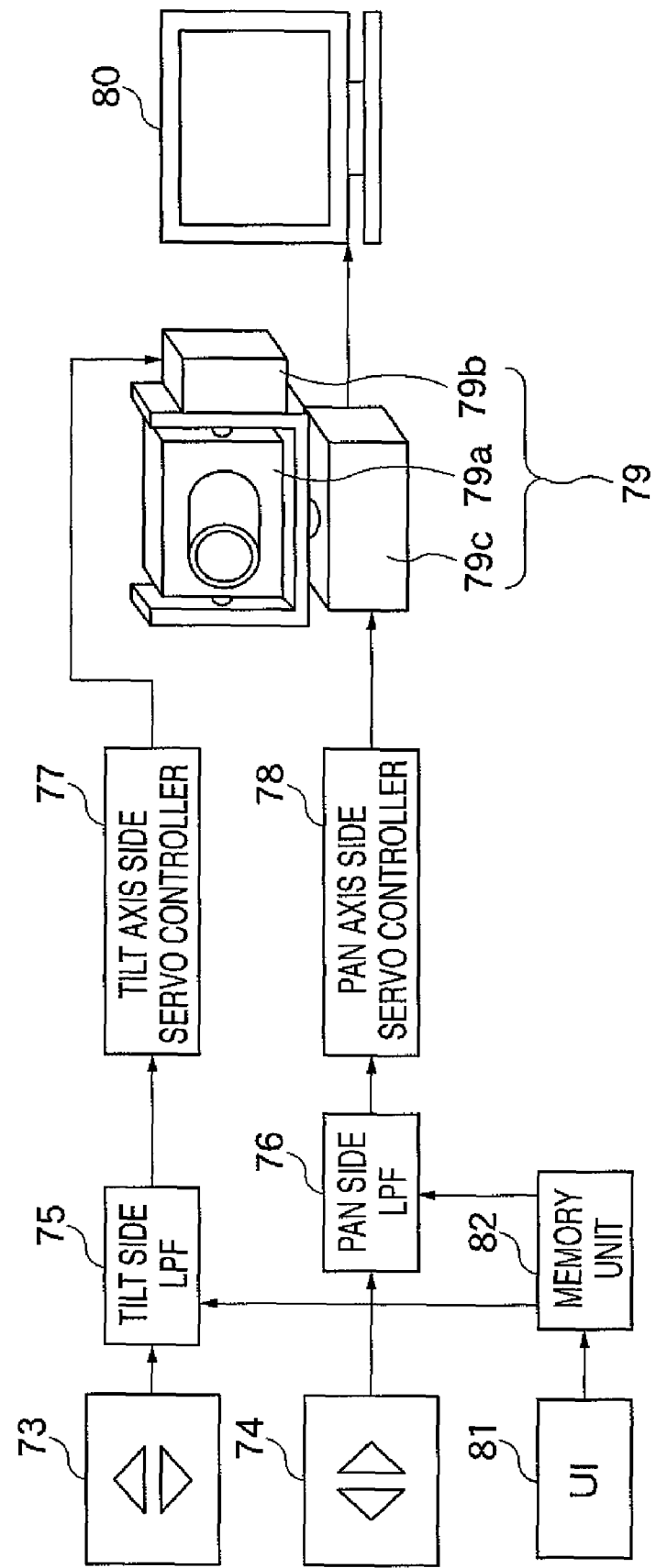
FIG. 23 is a block diagram showing the configuration of an image pickup system according to a fifth embodiment of the present invention.
Figure 24:
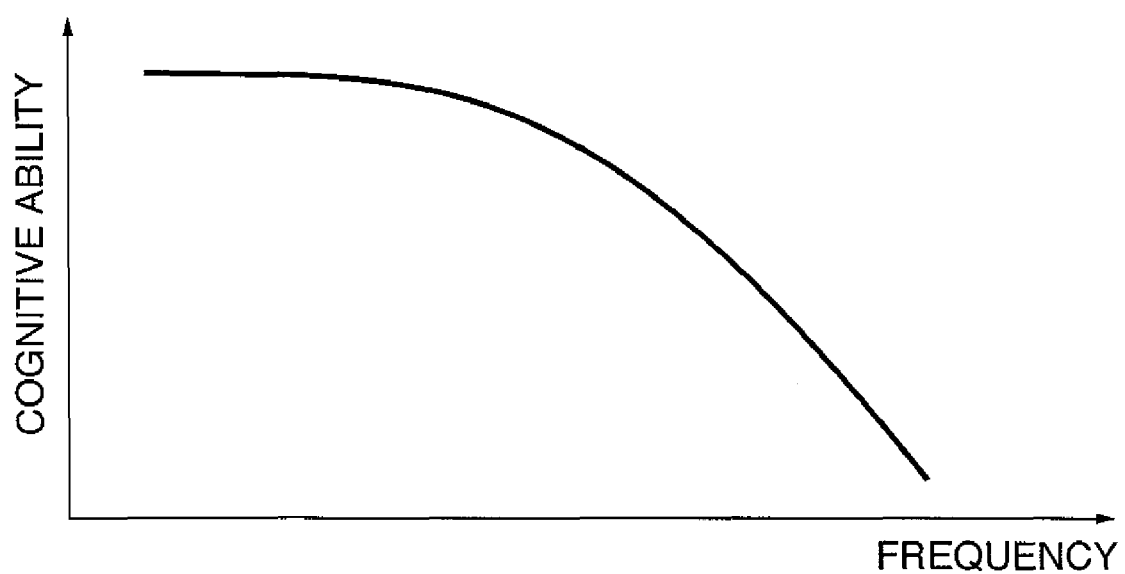
FIG. 24 is a graph showing the characteristic of the human dynamic visual acuity.

FIG. 23 is a block diagram showing the configuration of an image pickup system according to a fifth embodiment of the present invention.

In FIG. 23, the image pickup system according to the fifth embodiment of the present invention comprises angle command input sections 73 and 74, low-pass filters 75 and 76, a tilt axis side servo controller 77, a pan axis side servo controller 78, a video camera device 79 (a video camera 79a, a tilt axis drive mechanism 79b, and a pan axis drive mechanism 79c) and an image display 80. The image pickup system further comprises a user interface (UI) 81 and a memory unit 82.

The present embodiment is distinguished from the above first embodiment in that the UI 81 and the memory unit 82 are provided. Other components of the present embodiment are identical to corresponding components of the above first embodiment (FIG. 1), and therefore description thereof is omitted.

The low-pass filters 75 and 76 are variable filters whose cut-off frequencies can be changed. As a variable filter, a few methods can be considered, such as a method that a plurality of filters are provided and switched by a selector, and a method that the coefficient of a digital filter shown in FIGS. 4 and 5 is changed as necessary. The memory unit 82 stores data for setting the parameters of the low-pass filters 75 and 76. The parameters of the low-pass filters 75 and 76 are determined by a selection signal from the UI 81.

According to the present embodiment, at least one set of the above parameters is provided so that the cut-off frequency of the low-pass filter 75 associated with the tilt axis is set to become lower than that of the low-pass filter 76 associated with the pan axis. More specifically, one or more settings are provided to place emphasis upon smoothness of change in images and to prevent a sense of discomfort from being given to an observer.

Since there is individual difference in the human eyesight, and, for example, athletes usually have excellent dynamic visual acuity, they rarely feel a sense of discomfort even if the image moves fast to some extent. Further, depending on the goal of shoot, some cases place more weight on trackability for an object, and other cases place more weight on the smoothness of change in an image. The present embodiment is effective when it is desired that the trackability for the object and the smoothness of change in the image are adjusted, depending on an observer and the goal of shoot.

Note that, although, in the present embodiment, a case where the parameter of the low-pass filter is changed has been described, the present embodiment may be applied to such a system that a dead band is changed as shown in the above second embodiment. In addition, a variable filter or a variable dead band like the present embodiment may be applied to the above third and fourth embodiments. For an automatic tracking system, an operator and an observer are not the same person, it is highly likely that a sense of discomfort is caused when the image is observed, and there may be individual difference, and the present embodiment is therefore effective.

As described above, according to the present embodiment, by focusing attention on the anisotropy of human dynamic visual acuity, the image pickup system capable of changing the shooting direction of the video camera can obtain images to be observed without giving a sense of discomfort to an observer, while moving as fast as possible. This allows the image pickup device to obtain moving images suitable for a person to observe, at the time of automatic tracking in particular.

Other Embodiments

Although fields to which this image pickup system may be applied have not been specified in the first to fifth embodiments described above, the image pickup system may be applied to various fields. As concrete examples, the following fields may be considered: monitoring of a suspicious person (or object), tracking of a target object in a factory, image control to automatically place the image of a subject on a predetermined position within a screen, and observation and tracking of an object by changing a shooting direction, such as the control of a remote operation robot.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Example of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW and a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed the embodiments. The scope of the following claims is to be accorded the broadest interpretation so as to encompass all such modifications and equivalent structures and functions.

This application claims the benefit of Japanese Patent Application No. 2006-119258, filed Apr. 24, 2006. which is hereby incorporated by reference herein in its entirety.

What is claimed is:

1. An image pickup system comprising an image pickup device, and a drive section arranged to rotate said image pickup device in a first direction and a second direction orthogonal to said first direction, respectively, the image pickup system comprising:

a command section arranged to issue a directive on a first rotation target angle of said image pickup device associated with said first direction and output a first command signal, and a second rotation target angle of said image pickup device associated with said second direction and output a second command signal;

a first signal processing section arranged to cut a first component higher than a first specified cut-off frequency from the first command signal and output a first signal;

a second signal processing section arranged to cut a second component higher than a second specified cut-off frequency from the second command signal and output a second signal;

a storage section arranged to store a plurality of cut-off frequency settings, each of which is a combination of the first specified cut-off frequency and the second specified cut-off frequency determined in accordance with user's shooting goals;

a user interface arranged to select one setting from the plurality of cut-off frequency settings in accordance with an operation of user; and a control section arranged to output to said drive section a first rotation drive command associated with said first direction and a second rotation drive command associated with said second direction, respectively, based on the first and second signals, wherein the first specified cut-off frequency is set to be lower than the second specified cut-off frequency based on differences in a human cognitive ability between said first direction and said second direction, and wherein said control section sets the first specified cut-off frequency and the second specified cut-off frequency in accordance with the setting selected by the user with the user interface so that the first signal within the first specified cut-off frequency and the second signal within the second specified cut-off frequency are output to the drive section to rotate the image pickup device.

2. An image pickup system according to claim 1, wherein said first direction represents a vertical direction, and said second direction represents a horizontal direction.

3. An image pickup system according to claim 2, further comprising:
a display section arranged to display an image shot by the image pickup device,
wherein said display section displays said image so that said image changes in the vertical direction as the image pickup device is driven by the drive section in the vertical direction.

4. A shooting direction control method of an image pickup device that changes the shooting direction of said image pickup device having a drive section arranged to rotate said image pickup device in a first direction and a second direction orthogonal to said first direction, respectively, a storage unit, and a user interface, the method comprising:

a command step of issuing a directive on a first rotation target angle of said image pickup device associated with said first direction and output a first command signal, and a second rotation target angle of said image pickup device associated with said second direction and output a second command signal;

a first signal processing step of cutting a first component higher than a first specified cut-off frequency from the first command signal and output a first signal;

a second signal processing step of cutting a second component higher than a second specified cut-off frequency from the second command signal and output a second signal;

a storage step of storing a plurality of cut-off frequency settings, each of which is a combination of the first specified cut-off frequency and the second specified cut-off frequency determined in accordance with user's shooting goals, in the storage unit;

a selecting step of selecting one setting from the plurality of cut-off frequency settings in accordance with an operation of user from the user interface; and a control step for outputting to said drive section a first rotation drive command associated with said first direction and a second rotation drive command associated with said second direction, respectively, based on the first and second signals, wherein the first specified cut-off frequency is set to be lower than the second specified cut-off frequency based on differences in a human cognitive ability between said first direction and said second direction, and wherein the control step sets the first specified cut-off frequency and the second specified cut-off frequency in accordance with the setting selected in the selecting step so that the first signal within the first specified cut-off frequency and the second signal within the second specified cut-off frequency are output to the drive section to rotate the image pickup device.

5. A shooting direction control method according to of claim 4, wherein said first direction represents a vertical direction, and said second direction represents a horizontal direction.

6. A shooting direction control method according to claim 5, further comprising:
a display step for displaying an image shot by the image pickup device,
wherein said display step displays said image so that said image changes in the vertical direction as the image pickup device is driven by the drive section in the vertical direction.

7. A non-transitory computer-readable storage medium storing a computer program executable by a computer to implement the shooting direction control method of the image pickup device according to claim 4.

* * * * *